US008649474B2

(12) United States Patent
Terazawa

(10) Patent No.: US 8,649,474 B2
(45) Date of Patent: Feb. 11, 2014

(54) SYNCHRONOUS DETECTION METHOD AND DEVICE

(75) Inventor: Tomohito Terazawa, Okazaki (JP)

(73) Assignee: Denso Corporation, Kariya (JP)

( * ) Notice: Subject to any disclaimer, the term of this patent is extended or adjusted under 35 U.S.C. 154(b) by 157 days.

(21) Appl. No.: 13/424,720

(22) Filed: Mar. 20, 2012

(65) Prior Publication Data

US 2012/0243647 A1    Sep. 27, 2012

(30) Foreign Application Priority Data

Mar. 25, 2011  (JP) .................................. 2011-068049

(51) Int. Cl.
*H04L 7/00* (2006.01)
(52) U.S. Cl.
USPC .......................................... 375/354; 327/141
(58) Field of Classification Search
USPC ......................................................... 375/354
See application file for complete search history.

(56) References Cited

U.S. PATENT DOCUMENTS

| 7,058,002 | B1 * | 6/2006 | Kumagai et al. ............... 370/203 |
| 7,903,750 | B2 * | 3/2011 | Galperin et al. ............... 375/260 |
| 2004/0131012 | A1 * | 7/2004 | Mody et al. ................... 370/210 |
| 2005/0047526 | A1 | 3/2005 | Watanabe et al. |
| 2007/0230604 | A1 * | 10/2007 | Nakamura ...................... 375/260 |
| 2009/0067515 | A1 * | 3/2009 | Galperin et al. ............... 375/260 |
| 2010/0118849 | A1 * | 5/2010 | Kimura ......................... 370/338 |
| 2010/0202552 | A1 * | 8/2010 | Sakai et al. .................... 375/267 |
| 2012/0026994 | A1 * | 2/2012 | Agarwal et al. ................ 370/338 |

FOREIGN PATENT DOCUMENTS

JP    2005-102129    4/2005

OTHER PUBLICATIONS

Office action dated Apr. 23, 2013 in corresponding Japanese Application No. 2011-068049.

* cited by examiner

*Primary Examiner* — Erin File
(74) *Attorney, Agent, or Firm* — Harness, Dickey & Pierce, PLC

(57) ABSTRACT

In a synchronous detection of an OFDM signal as an input signal composed of carrier waves, a clock generation part generates clock signals CK1 to CKk having a frequency quadruple of a frequency of each of carrier waves. A TAD sequentially calculates a moving average of the input signal by using the clock signals CK1 to CKk every quarter period of each carrier wave. A detection processing part sequentially executes addition-subtraction operation of the moving average values obtained by the TAD in order to calculate an amplitude value of each carrier wave. An unwanted component eliminating part subtracts amplitude values containing components of carrier waves having an odd multiple frequency of the carrier wave thereof from the amplitude values of the carrier waves in the input signal by a value which is an odd-submultiple of the amplitude value of the carrier wave having the odd-multiplied frequency.

12 Claims, 12 Drawing Sheets

FIG.3

ADDITION-SUBTRACTION CIRCUIT 42(1s): $D(1s) = \sum_{n=1}^{2} DT1_n - \sum_{n=3}^{4} DT1_n$ ADDITION-SUBTRACTION CIRCUIT 42(1c): $D(1c) = DT1_1 - \sum_{n=2}^{3} DT1_n + DT1_4$ ADDITION-SUBTRACTION CIRCUIT 42(2s): $D(2s) = \sum_{n=1}^{2} DT2_n - \sum_{n=3}^{4} DT2_n + \sum_{n=5}^{6} DT2_n - \sum_{n=7}^{8} DT2_n$ ADDITION-SUBTRACTION CIRCUIT 42(2c): $D(2c) = DT2_1 - \sum_{n=2}^{3} DT2_n + \sum_{n=4}^{5} DT2_n - \sum_{n=6}^{7} DT2_n + DT2_8$ ADDITION-SUBTRACTION CIRCUIT 42(3s): $D(3s) = \sum_{n=1}^{2} DT3_n - \sum_{n=3}^{4} DT3_n + \sum_{n=5}^{6} DT3_n - \sum_{n=7}^{8} DT3_n + \sum_{n=9}^{10} DT3_n - \sum_{n=11}^{12} DT3_n$ ADDITION-SUBTRACTION CIRCUIT 42(3c): $D(3c) = DT3_1 - \sum_{n=2}^{3} DT3_n + \sum_{n=4}^{5} DT3_n - \sum_{n=6}^{7} DT3_n + \sum_{n=8}^{9} DT3_n - \sum_{n=10}^{11} DT3_n + DT3_{12}$

...

ADDITION-SUBTRACTION CIRCUIT 42(ks): $D(ks) = \sum_{n=1}^{2} DTk_n - \sum_{n=3}^{4} DTk_n + \sum_{n=5}^{6} DTk_n - \sum_{n=7}^{8} DTk_n + \cdots + \sum_{n=4k-3}^{4k-2} DTk_n - \sum_{n=4k-1}^{4k} DTk_n$ ADDITION-SUBTRACTION CIRCUIT 42(kc): $D(kc) = DTk_1 - \sum_{n=2}^{3} DTk_n + \sum_{n=4}^{5} DTk_n - \sum_{n=6}^{7} DTk_n + \cdots - \sum_{n=4k-2}^{4k-1} DTk_n + DTk_{4k}$

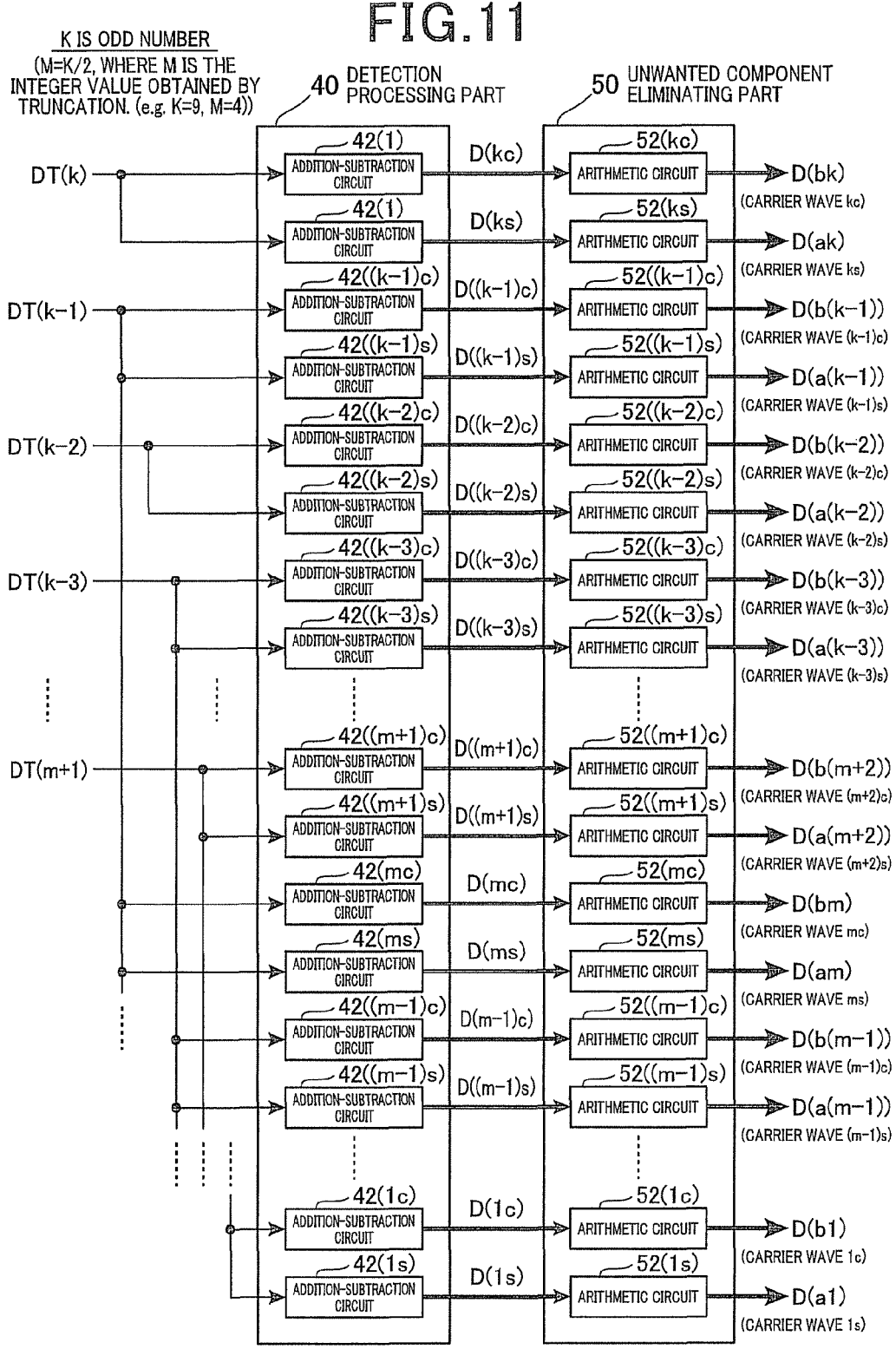

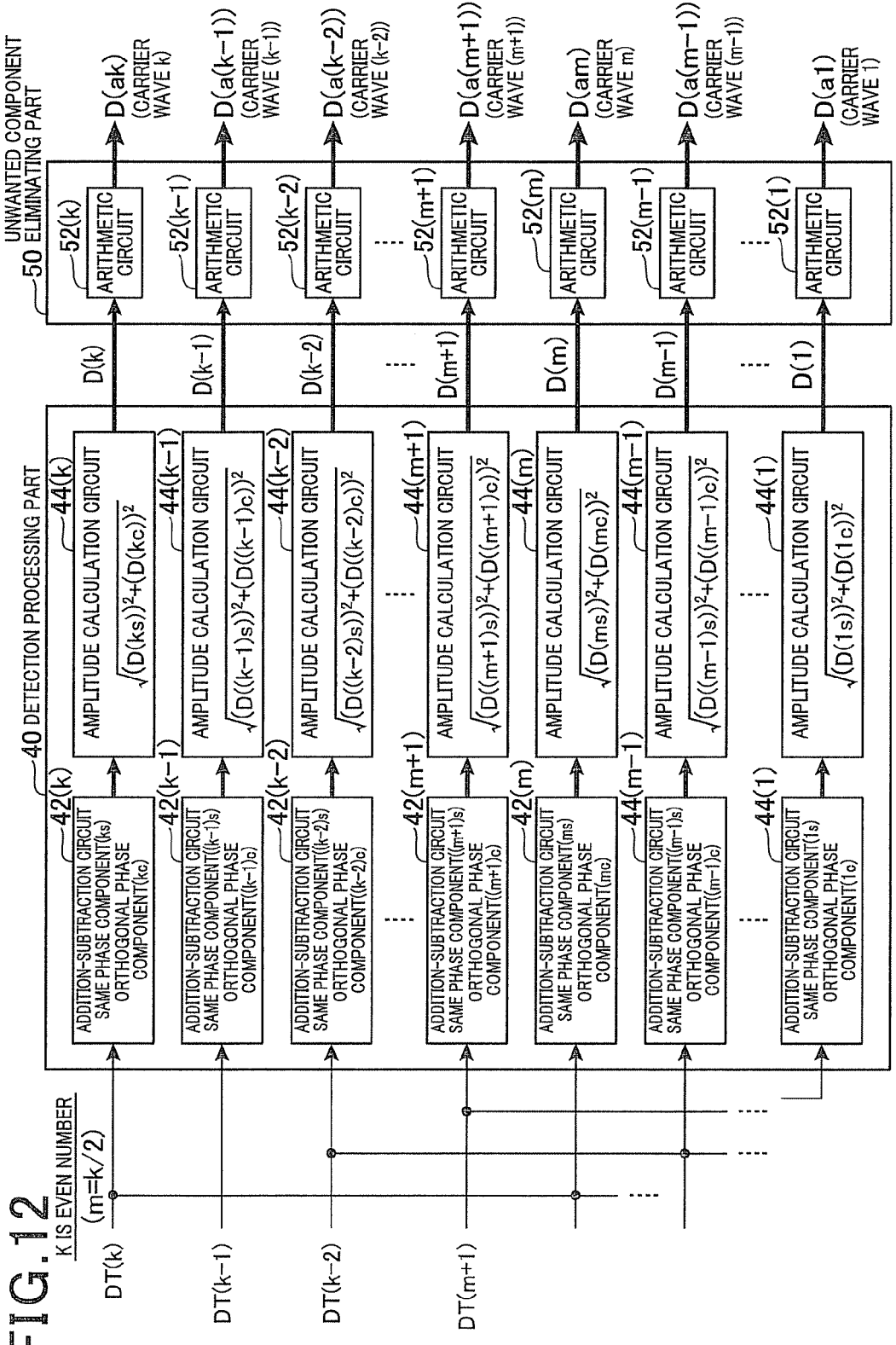

SYNCHRONOUS DETECTION METHOD AND DEVICE

CROSS-REFERENCE TO RELATED APPLICATION

This application is related to and claims priority from Japanese Patent Application No. 2011-068049 filed on Mar. 25, 2011, the contents of which are hereby incorporated by reference.

BACKGROUND OF THE INVENTION

1. Field of the Invention

The present invention relates to methods and devices for executing a synchronous detection of a multiplex signal as an input signal composed of a plurality of carrier waves having a different frequency in order to obtain an amplitude value of each of the carrier waves.

2. Description of the Related Art

In order to correctly receive a multiplex signal with FDM (Frequency Division Multiplexing) or OFDM (Orthogonal Frequency Division Multiplexing), which is composed of a plurality of carrier waves, transmitted from a transmitter, a receiver must have a synchronous detection device. The synchronous detection device synchronously detects each of the carrier waves having a different frequency from the received multiplex signals.

For example, Japanese patent laid open publication JP 2005-102129 has proposed a conventional synchronous detection device which sequentially calculates a moving-average value of received signals every half (or quarter) period of a carrier wave having the maximum frequency in a plurality of carrier waves as a detection target. The conventional synchronous detection device adds the moving average value per carrier wave in the front half of the period of this carrier wave, and subtracts the moving average value per carrier wave in the latter half of this carrier wave in order to execute the synchronous detection of each of the carrier waves.

The conventional synchronous detection device has a time analogue to digital converter (TAD) equipped with a pulse delay circuit composed of a plurality of delay units connected in series in order to calculate such a moving average value of each of received carrier waves. This structure of the conventional synchronous detection device makes it possible to execute the synchronous detection of a plurality of the received carrier waves simultaneously without using any analogue circuits such as an operational amplifier and an analogue filter.

However, the conventional synchronous detection device described above can execute the synchronous detection only for a multiplex signal obtained by synthesizing carrier waves having a frequency which is a power of two times the frequency of a reference carrier wave (i.e. 2nfc where n=0, 1, 2 . . . , and fc is the carrier frequency) because the reference carrier wave has the minimum frequency in the received carrier waves. That is, it is difficult for the conventional synchronous detection device to execute the synchronous detection of a multiplex signal obtained by synthesizing carrier waves having an integer multiple (1, 2, 3, . . . , n times) of the frequency of the reference carrier wave.

That is, if the conventional synchronous detection device previously described executes the synchronous detection of such a type of the multiplex signal having a integer frequency multiple (1, 2, 3, . . . , n times) of the frequency of the reference carrier wave, the obtained detection result contains carrier wave components having an odd frequency multiple of the frequency of this carrier wave. The conventional synchronous detection device provides a correct result only when the multiplex signal obtained by synthesizing carrier waves has a frequency which is the power of two times the frequency of the reference carrier wave. This problem limits the use and application of the conventional synchronous detection device.

Further, such a multiplex signal obtained by synthesizing carrier waves having various frequencies which are the power of two times of the frequency of the reference carrier wave needs to use a large frequency band when compared with a frequency band of a multiplex signal obtained by synthesizing carrier waves having an integer multiple frequency of the reference carrier wave only when they has the same number of the carrier waves.

As described above, the conventional synchronous detection device decreases the efficiency in use of the frequency band, and the structure of the conventional synchronous detection device limits the application field thereof. Further, the structure of the conventional synchronous detection device is required to have a large circuit size because of using a wide frequency band, and increases the cost of a communication system. Still further, the conventional synchronous detection device has a low detection quality because noises are easily suspended on carrier waves by using such a wide frequency band.

SUMMARY

It is therefore desired to provide a novel synchronous detection method and device capable of executing a synchronous detection of a multiplex signal composed of a plurality of carrier waves having an integer multiple frequency of a reference frequency by using a time analogue to digital converter.

An exemplary embodiment provides a synchronous detection method of detecting an amplitude value of each of carrier waves as a synchronous detection target. In the method, a multiplex signal as an input signal composed of a plurality of carrier waves having a different frequency is received. A moving average of each of the carrier waves in the received multiplex signal is sequentially executed every half or quarter period of each of the carrier waves. The moving average of each of the carrier wave is added during a one-half period which is a one-half of the period of each of the carrier waves. The moving average of each of the carrier wave is also subtracted during the other-half period which is the remaining half of the period of each of the carrier wave.

After calculating the moving average of each of the carrier waves, unwanted amplitude values of other carrier waves, whose frequencies are higher than the frequencies of the carrier waves as the detection target is subtracted from the amplitude values of the carrier waves as the detection target.

Another exemplary embodiment provides a synchronous detection device for detecting an amplitude value of each of carrier waves as a detection target. The synchronous detection device has a moving average calculation part, a detection processing part and an unwanted component eliminating part. The moving average calculation part receives a multiplex signal as an input signal composed of a plurality of carrier waves having a different frequency. The moving average calculation part sequentially calculates a moving average of each of the carrier waves in the received multiplex signal every half or quarter period of a period of each of the carrier waves. The detection processing part adds the moving average of each of the carrier waves, obtained by the moving average calculation part, during a one-half period which is a one-half of the period of each of the carrier waves. Further, the detection processing part subtracts the moving average of each of the carrier wave during the other half period which is the remaining half of the period of each of the carrier waves. The unwanted component eliminating part eliminates, from the amplitude values of the carrier waves as the detection target, unwanted amplitude values of other carrier waves whose frequencies are higher than the frequencies of the carrier waves as the detection target.

BRIEF DESCRIPTION OF THE DRAWINGS

A preferred, non-limiting embodiment of the present invention will be described by way of example with reference to the accompanying drawings, in which:

FIG. 3 is a view showing the operation of addition-subtraction circuits in a detection processing part of the synchronous detection device according to the first exemplary embodiment of the present invention;

FIG. 11 is a view showing a block diagram of a configuration of a modification of the detection processing part and the unwanted component eliminating part in the synchronous detection device according to the fourth exemplary embodiment of the present invention; and FIG. 12 is a view showing a block diagram of a configuration of a modification of the detection processing part and the unwanted component eliminating part in the synchronous detection device according to the fourth exemplary embodiment of the present invention.

DETAILED DESCRIPTION OF THE PREFERRED EMBODIMENTS

Figure 1:
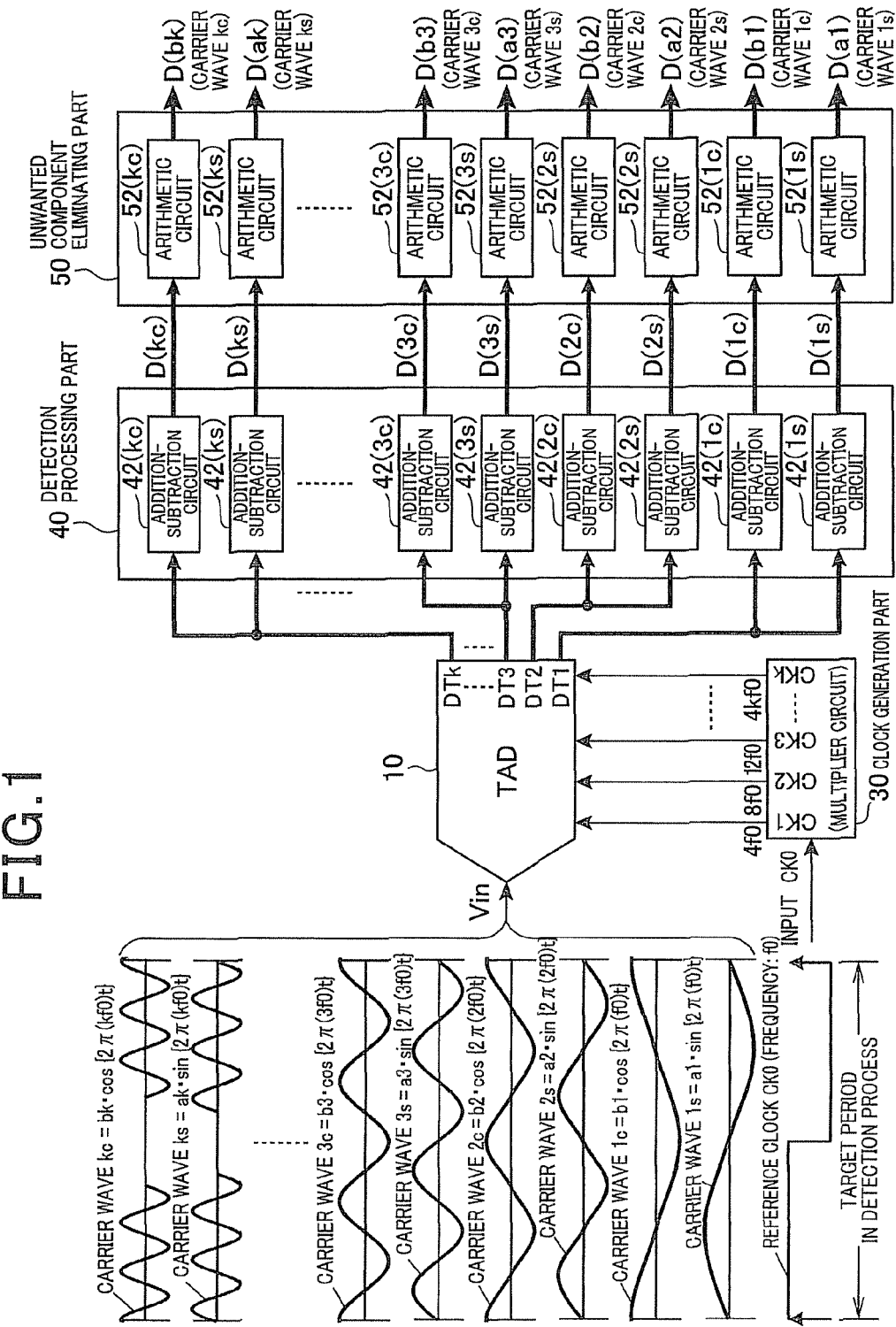
FIG. 1 is a block diagram showing an entire configuration of a synchronous detection device according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

First Exemplary Embodiment

A description will be given of a synchronous detection device according to a first exemplary embodiment of the present invention.

FIG. 1 is a block diagram showing an entire configuration of the synchronous detection device according to the first exemplary embodiment. The synchronous detection device receives an OFDM (orthogonal frequency division Multiplexing) signal Vin as an input signal.

As shown in FIG. 1, the synchronous detection device receives the OFDM signal Vin as the input signal Vin. Such an OFDM signal is generated as a multiplex signal by synthesizing a plurality of carrier waves which have been processed by amplitude modulation. The carrier waves are composed of two types of carrier waves having a difference in phase of 90°. One group has carrier waves $1s$, $2s$, $3s$, ..., and ks (s designates a sign curve) and carrier waves $1c$, $2c$, $3$, ..., and kc (c designates a cosine wave). For example, the carrier wave is different in phase from the carrier wave $1c$ by 90°, and the carrier wave $2s$ is different in phase from the carrier wave $2c$ by 90°. The carrier waves $1s$, $2s$, $3s$, ..., and the carrier waves $1c$, $2c$, $3c$, ... have a frequency which is an integer multiple $(1, 2, 3, ..., k)$ of the frequency f0 of a reference clock CK0, respectively.

The synchronous detection device according to the first exemplary embodiment receives the input signal Vin (OFDM signal), and executes the synchronous detection for each of the carrier waves $1s$, $2s$, $3s$, ..., and ks, and $1c$, $2c$, $3c$, ..., and kc in order to detect each of amplitude values D(a1), D(a2), D(a3), ..., D(ak), D(b1), D(b2), D(b3), ..., and D(bk).

The synchronous detection device according to the first exemplary embodiment has a clock generation part (multiplier circuit) 30 and a time analogue to digital conversion unit 10 (which will be referred to as the "TAD 10").

The clock generation part 30 generates k clock signals CK1, CK2, CK3, ..., CKk. Those k clock signals CK1, CK2, CK3, ..., CKk have frequencies 4f0, 8f0, 12f0, ..., and 4kf0, respectively, which are quadruple values of frequencies f0, 2f0, 3f0, ..., kf0 of the carrier waves, respectively Those frequencies f0, 2f0, 3f0, ..., kf0 of the carrier waves are obtained by multiplication of a reference clock CK0. The TAD 10 calculates the moving average of the input signal Vin every quarter period of the period of each carrier wave by using the k clock signals CK1, CK2, CK3, ..., CKk generated by the clock generation unit 30.

Figure 2:
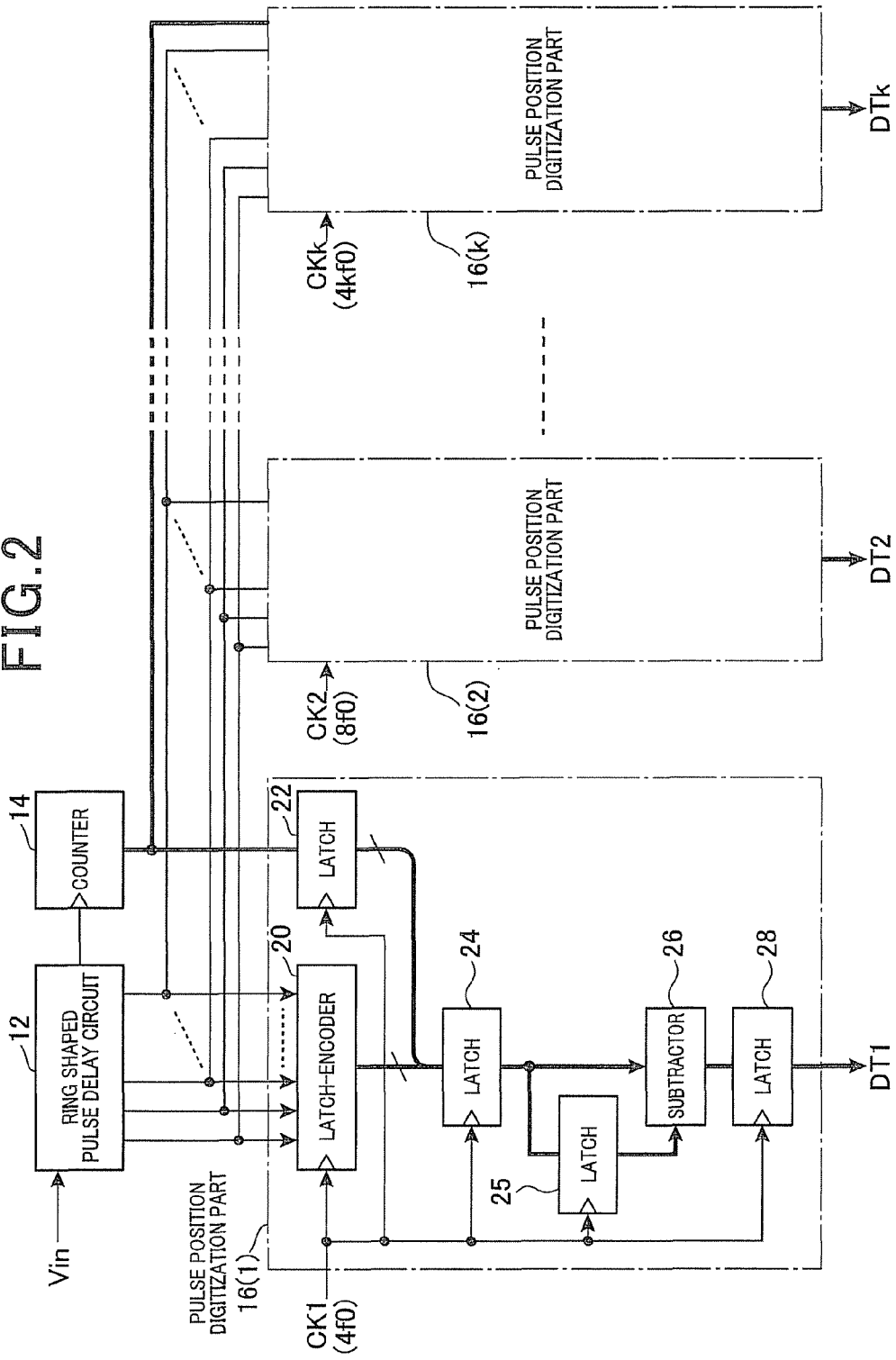
FIG. 2 is a view showing a block diagram of a configuration of a time analogue to digital converter (TAD) in the synchronous detection device according to the first exemplary embodiment of the present invention.

FIG. 2 is a view showing a block diagram of a configuration of the TAD in the synchronous detection device according to the first exemplary embodiment of the present invention.

As shown in FIG. 2, the TAD 10 has a ring-shaped pulse delay circuit 12 (which will be referred to as the "pulse delay circuit 12"), a counter 14, and k pulse position digitization parts $16(1), 16(2), 16(3), ..., 16(k)$. The pulse delay circuit 12 has a plurality of delay units. Each of the delay units receives a pulse signal and outputs a delayed pulse signal. The delay units are arranged in a plurality of operation stages. The delay units are connected to each other in a ring shaped configuration. The counter 14 counts the transmission number of a pulse signal in the pulse delay circuit 12. When receiving the k clock signals CK1, CK2, CK3, ..., CKk generated by the clock generation unit 30, each of the k pulse position digitization parts $16(1), 16(2), 16(3), ..., 16(k)$ starts its operation.

Each of the delay units connected in a ring shape configuration in the pulse delay circuit 12 is composed of a gate circuit. The gate circuit is composed of inverters, etc. Each of the delay units receives the input signal Vin as a drive voltage through a buffer.

A delay time of each of the delay unit is equal to a time corresponds to a voltage level of the input signal Vin. For example, the number of the delay units in the pulse delay circuit 12, through which the pulse signal is passing, within one period of the clock signal CK1 (that is, during a quarter of the period of the carrier waves 1s or 1c), becomes a moving average value of a voltage level of the input signal Vin during this period.

The k pulse position digitization parts 16(1), . . . , and 16(k) detect the number of the delay units, through which the pulse signal has passed every period of each of the clock signals CK1, CK2, CK3, . . . , CKk on the basis of the clock signals CK1, CK2, CK3, . . . , CKk supplied form the clock generation part 30. The k pulse position digitization parts 16(1), 16(2), 16(3), . . . , 16(k) output the detected values as the moving average values DT1, DT2, DT3, . . . , DTk obtained by the moving average per quarter of the period of each carrier wave.

That is, each of the k pulse position digitization parts 16(1), . . . , 16(k) has a latch encoder 20 and latch circuits 22, 24, 25 and 28. Each of the latch encoder 20 and the latch circuits 22, 24, 25 and 28 operates at a rising timing of the corresponding clock signal CK1, CK2, CK3, . . . , CKk.

The latch-encoder 20 detects (or latches) an arriving position of the pulse signal in the pulse delay circuit 12, and converts the detected arriving position to digital data composed of a predetermined bit length which indicates what number is the stage of the delay unit which detects the arrived pulse signal. The latch circuit latches the count number of the counter 14 at the above rising timing.

In addition, at the above timing, the latch circuit 24 latches the digital data output from the latch encoder 20 as the low bit data, and further latches the counter value output from the latch circuit 22 as the upper bit data. The latch circuit 25 latches the digital data output from the latch circuit 24 at the above rising timing.

Next, the digital data latched by each of the latch circuits 24 and 25 are supplied to the subtractor 26. When receiving the digital data, the subtractor 26 subtracts the received digital data supplied by the latch circuit 25 from the digital data output from the latch circuit 24 in order to calculate the number of the delay units through which the pulse signal has passed in the pulse delay circuit 12 during the one period of the corresponding clock signals CK1, CK2, CK3, . . . , CKk.

The latch circuit 28 latches the digital, data output from the subtractor 26 at the rising timing, and outputs the digital data as the moving average value DT1, DT2, DT3, . . . , DTk which is obtained by the moving average of the input signal Vin during one period of the corresponding clock signals CK1, CK2, CK3, . . . , CKk. The above digital data represent the number of the delay units through which the pulse signal has passed during one period of the corresponding clock signals CK1, CK2, CK3, . . . , CKk.

The moving average values DT1, DT2, DT3, . . . , DTk, which are generated every period of the clock signals CK1, CK2, CK3, . . . , CKk (in other words, every quarter period of the period of each carrier wave), are output to a detection processing part 40.

FIG. 3 is a view showing the operation of addition-subtraction circuits 42(1s), 42(2s), 42(3s), . . . , 42(ks), 42(1c), 42(2c), 42(3c), . . . , 42(kc) in a detection processing part of the synchronous detection device according to the first exemplary embodiment of the present invention.

The detection processing part 40 has addition-subtraction circuits 42(1s), 42(2s), 42(3s), . . . , 42(ks), 42(1c), 42(2c), 42(3c), . . . , 42(kc). Each of the addition-subtraction circuits 42(1s), 42(2s), 42(3s), . . . , 42(ks), 42(1c), 42(2c), 42(3c), . . . , 42(kc) calculates each of amplitude values D(1s), D(2s), D(3s), . . . , D(ks), D(1c), D(2c), D(3c), . . . , D(kc) of the carrier waves 1s, 2s, 3s, . . . , ks, 1c, 2c, 3c, . . . , kc by addition-subtraction operation (addition-subtraction calculation) of each of the moving average values DT1, DT2, DT3, . . . , DTk obtained during the target detection period as one period of the reference clock CK0 due to the arithmetic equations shown in FIG. 3.

Each of the addition-subtraction circuits 42(1s), 42(2s), 42(3s), . . . , 42(ks), 42(1c), 42(2c), 42(3c), . . . , and 42(kc) adds a positive area (moving average value) and a negative area (moving average value) observed from a zero cross line in the wave form of the target carrier wave according to the equations shown in FIG. 3. Each of the addition-subtraction circuits 42(1s), 42(2s), 42(3s), . . . , 42(ks), 42(1c), 42(2c), 42(3c), . . . , and 42(kc) outputs the result of the addition as the amplitude value of the target carrier wave.

By the way, when the amplitude values D(1s), D(2s), D(3s), . . . , D(ks), D(1c), D(2c), D(3c), . . . , D(kc) of each of the carrier waves 1s, 2s, 3s, . . . , ks, 1c, 2c, 3c, . . . , kc are calculated and the input signal Vin has carrier waves having a frequency which is an even multiple of the frequency of the target carrier wave, it is possible to eliminate those carrier waves as unwanted components (or unwanted carrier wave components) by using the arithmetic equations shown in FIG. 3. Also, when the input signal Vin has carrier waves having an odd multiple frequency of the target carrier wave, it is impossible to eliminate those carrier waves as unwanted carrier wave components. In this case, the calculated amplitude value contains a part of the unwanted carrier wave components.

Specifically, for example, when input signal Vin contains carrier waves having a frequency three multiple times the frequency of the target carrier wave, amplitude values one-third of the amplitude values of those carrier waves remain in the input signal Vin. Further, for example, when carrier waves having a frequency five times of the frequency of the target carrier wave are contained in the input signal Vin, amplitude values one-fifth of the amplitude values of those carrier waves are remained in the input signal Vin.

That is, when the input signal Vin contains carrier waves (which will be referred to as the "special carrier waves") having an odd frequency multiple (2x+1) of the frequency of the target carrier waves, the amplitude values obtained by the detection processing part 40 contains unwanted components the amplitude values, as the unwanted components, $1/(2x+1)$ multiple of the amplitude values of the special carrier waves having an odd frequency multiple (2x+1) (where, a is a positive integer: 1, 2, 3, . . . ) of the frequency of the target carrier wave In order to avoid the above drawback, the synchronous detection device having the improved and novel structure and functions according to the first exemplary embodiment has an unwanted component eliminating part 50. The unwanted component eliminating part 50 is capable of eliminating such unwanted components from the amplitude value D(1s), D(2s), D(3s), . . . , D(ks), D(1c), D(2c), D(3c), . . . , D(kc) of the carrier waves is, 2s, 3s, . . . , ks, 1c, 2c, 3c, . . . , kc calculated by the detection processing part 40.

The unwanted component eliminating part 50 is composed of arithmetic circuits 52(1s), 52(2s), 52(3s), . . . , 52(ks), 52(1c), 52(2c), 52(3c), . . . 52(kc). The arithmetic circuits 52(1s), 52(2s), 52(3s), . . . , 52(ks), 52(1c), 52(2c), 52(3c), . . . , 52(kc) eliminate the unwanted components from the amplitude value D(1s), D(2s), D(3s), . . . , D(ks), D(1c), D(2c), D(3c), . . . , D(kc) output from the addition-subtraction circuits 42(1s), 42(2s), 42(3s), . . . , 42(ks), 42(1c), 42(2c), 42(3c), . . . , 42(kc) in the detection processing part 40. Then, the arithmetic circuits 52(1s), 52(2s), 52(3s), . . . , 52(ks), 52(1c), 52(2c), 52(3c), . . . 52(kc) output the amplitude values D(a1), D(a2), D(a3), . . . , D(ak), D(b1), D(b2), D(b3), . . . , D(bk), respectively.

Figure 4:
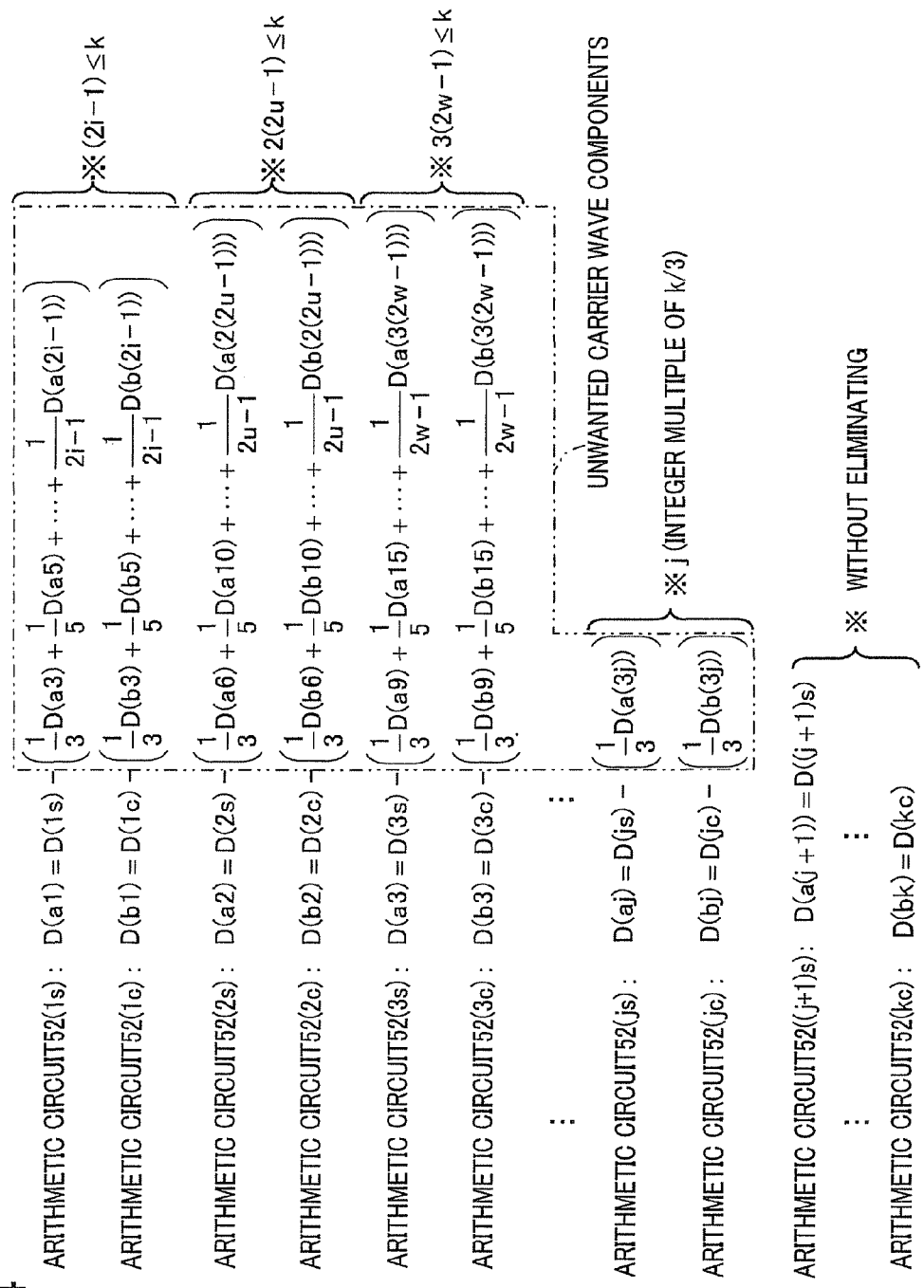
FIG. 4 is a view showing the operation of arithmetic circuits in an unwanted component eliminating part in the synchronous detection device according to the first exemplary embodiment of the present invention.

FIG. 4 is a view showing the operation of arithmetic circuits in the unwanted component eliminating part 50 in the synchronous detection device according to the first exemplary embodiment of the present invention.

The arithmetic circuits 52(1s), 52(2s), 52(3s), . . . , 52(ks), 52(1c), 52(2c), 52(3c), . . . and 52(kc) execute arithmetic operations, respectively, shown in FIG. 4 in order to eliminate the unwanted components of the special carrier waves. The arithmetic operations, respectively, shown in FIG. 4 subtract, from each of the above amplitude values, the value odd submultiple (1/(2x+1)) of the amplitude value of the special carrier wave (sine wave or cosine wave) having an odd frequency multiple of the frequency of the target carrier wave and the same phase of the target carrier wave.

For example, when the carrier wave jc having the same phase of a cosine wave of the carrier wave kc having the maximum frequency, and having a frequency one-third of the frequency of the carrier wave kc, because the input signal Vin contains only the carrier wave kc having an odd-multiplied frequency, it is possible to eliminate the unwanted component one-third of the amplitude value D(bk) {=D (kc)} of the carrier wave kc. However, when the frequency of the target carrier wave is higher than the frequency of the carrier wave jc, the unwanted component eliminating part 50 outputs the amplitude value calculated by the detection processing part 40 because there is no unwanted component to be eliminated. The arithmetic circuit acts as a buffer in the unwanted component eliminating part 50 because the arithmetic circuit directly outputs the amplitude value calculated by the detection processing part 40 without processing.

As previously described in detail, the synchronous detection device according to the first exemplary embodiment executes the following operations (1), (2) and (3) when executing the synchronous detection of the input signal Vin (OFDM signal) obtained by synthesizing 2×k carrier waves 1s, 2s, 3s, . . . , ks, 1c, 2c, 3c, . . . , kc, each having a phase different of 90° (90 degrees) to each other and having a frequency an integer multiple (1, 2, 3, . . . , and k times) of the frequency f0 of the reference clock CK0.

(1) The clock generation part 30 generates the clock signals CK1, CK2, CK3, . . . , CKk having a frequency four times of the frequency of each carrier wave.

(2) The TAD 10 calculates the moving average of the input signal Yin every quarter period of the period of each of the carrier waves by using each of the clock signals CK1, CK2, CK3, . . . , CKk generated on the basis of reference clock signal CK0 by the clock generation part 30.

(3) The detection processing part 40 sequentially adds or subtracts the moving average value DT1, DT2, DT3, . . . , DTk generated on the basis of the clock signals CK1, CK2, CK3, . . . , CKk by the TAD 10 in order to obtain the amplitude values D(1s), D(2s), D(3s), . . . , D(ks), D(1c), D(2c), D(3c), . . . , D(kc) of the carrier waves 1s, 2s, 3s, . . . , ks, 1c, 2c, 3c, . . . , kc.

In the amplitude values D(is), D(2s), D(3s), . . . , D(ks), D(1c), D(2c), D(3c), . . . , D(kc) of the carrier waves 1s, 2s, 3s, . . . , ks, 1c, 2c, 3c, . . . , kc obtained by the above process, the unwanted component eliminating part 50 adjusts the amplitude values D(1s), D(2s), D(3s), . . . , D(js), D(ic), D(2c), D(3c), . . . , and D(jc) of the carrier waves 1s, 2s, 3s, . . . , js, 1c, 2c, 3c, . . . , jc having a low frequency by using the amplitude value of the carrier wave having the same sine wave "s" or the same cosine wave "c" (in other words, the same phase) in the two types of the carrier waves having an odd frequency multiple of the frequency, where the carrier waves 1s, 2s, 3s, . . . , js, 1c, 2c, 3c, . . . , jc having a low frequency contain the carrier waves having odd frequency multiples 3f, 5f, 7f, . . . of the frequency f of the input signal Vin.

Accordingly, even if the input signal Vin is an OFDM (Orthogonal Frequency-Division Multiplexing) signal synthesized by using carrier waves having frequencies integer multiple (1, 2, 3, . . . , times) of the reference frequency f0, the synchronous detection device according to the first exemplary embodiment can eliminate, from the amplitude value of each of the carrier waves obtained by the detection processing part 40, unwanted components having a frequency which is an multiple of the frequency of the carrier waves obtained by the detection processing part 40. Thus, the synchronous detection circuit of the first exemplary embodiment can detect the amplitude value of each of the carrier waves with high accuracy.

As previously described, the synchronous detection device according to the first exemplary embodiment has the unwanted component eliminating part 50 having such an improved and novel configuration. The other components of the synchronous detection device according to the first exemplary embodiment approximately have the same structure of the components in the synchronous detection device disclosed in Japanese patent laid open publication No. JP 2005-102129. Therefore it is possible for the synchronous detection device according to the first exemplary embodiment to execute the synchronous detection of OFDM signals by the digital processing executed by the TAD 10 without using analogue circuits such as operational amplifiers and analogue filters. Still further, the unwanted component eliminating part 50 has the structure shown in FIG. 4 without using any analogue circuit.

It is possible to make the synchronous detection device according to the first exemplary embodiment by using various types of digital gate circuits formed in an integrated circuit. This structure of the synchronous detection device makes it possible to decrease the circuit area, and the entire size of the synchronous detection device as an IC chip, and further to decrease the manufacturing cost thereof.

In the structure of the synchronous detection device according to the first exemplary embodiment previously described, the TAD 10 corresponds to a moving average calculation part, the detection processing part 40 corresponds to a detection processing part, the unwanted component eliminating part 50 corresponds to an unwanted component eliminating part, and the clock generation part 30 corresponds to a clock generating part.

The pulse delay circuit 12 having a ring shape structure and the counter 14 correspond to a pulse delay part, and the k pulse position digitization parts 16(1), 16(2), 16(3), . . . , 16(k) correspond to pulse position digitization parts.

Second Exemplary Embodiment

A description will be given of a synchronous detection device according to a second exemplary embodiment of the present invention.

Figure 5:
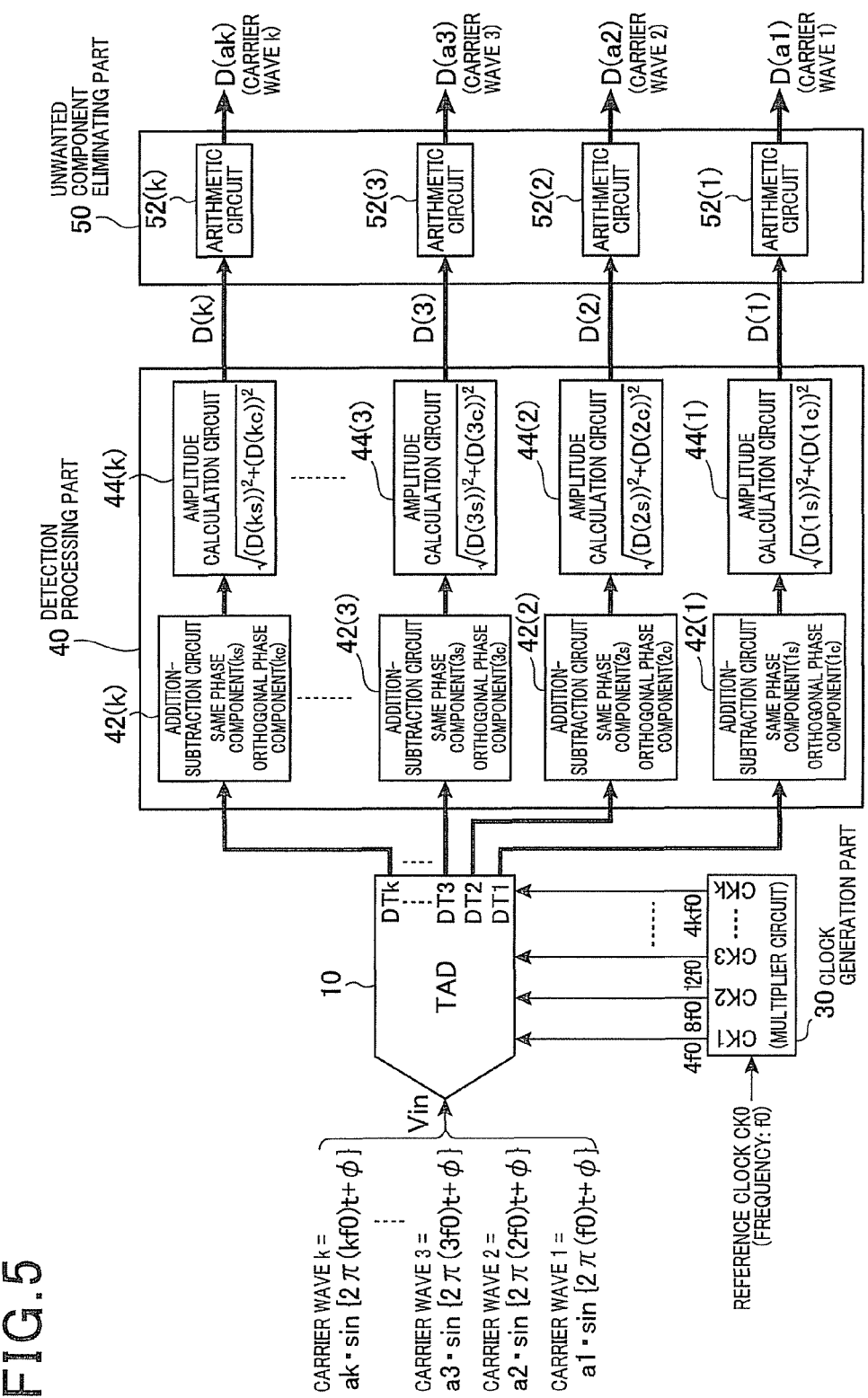
FIG. 5 is a view showing an entire configuration of a synchronous detection device according to a second exemplary embodiment of the present invention.

FIG. 5 is a view showing an entire configuration of the synchronous detection device according to the second exemplary embodiment.

As shown in FIG. 5, the synchronous detection device according to the second exemplary embodiment receives a FDM (Frequency Division Multiplexing) signal as the input signal Vin. Such a FDM signal is made by synthesizing amplitude-modulated carrier waves (sine waves) having a frequency an integer multiple (1, 2, 3, . . . , k times) of the frequency f0 of the reference clock signal CK0 and having a phase difference of φ against the phase of the reference clock signal CK0.

The synchronous detection device according to the second exemplary embodiment receives such a FDM signal as the input signal Vin, and executes the synchronous detection of each of the carrier waves 1, 2, 3, . . . , and k in order to detect the amplitude values D(a1), D(a2), D(a3), . . . , D(ak) thereof.

The synchronous detection device according to the second exemplary embodiment has the clock generation part 30, the detection processing part 40 and the unwanted component eliminating part 50, like the structure of the synchronous detection device according to the first exemplary embodiment, previously described.

Because the clock generation part 30 and the detection processing part 40 in the synchronous detection device according to the second exemplary embodiment have the same structure and function of those of the synchronous detection device according to the first exemplary embodiment, the explanation of those components is omitted here for brevity.

Next, a description will now be given of the detection processing part 40 and the unwanted component eliminating part 50 in the synchronous detection device according to the second exemplary embodiment.

Similar to the structure of the addition-subtraction circuits in the detection processing part 40 of the synchronous detection device according to the first exemplary embodiment, the detection processing part 40 in the synchronous detection device according to the second exemplary embodiment has addition-subtraction circuits 42(1), 42(2), 42(3), . . . , 42(k) and the amplitude calculation circuits 44(1), 44(2), 44(3), . . . , 44(k).

The addition-subtraction circuits 42(1), 42(2), 42(3), . . . , 42(k) calculate the same phase components D(1s), D(2s), D(3s), . . . , D(ks) in the carrier waves 1, 2, 3, . . . , and k which are in synchronization with the clock signals CK1, CK2, CK3, . . . , CKk. Further, the addition-subtraction circuits 42(1), 42(2), 42(3), . . . , 42(k) calculate orthogonal components D(1c), D(2c), D(3c), . . . , D(kc) having a phase difference of 90° of the clock signals CK1, CK2, CK3, . . . , CKk. Those components are obtained by executing the addition-subtraction operation (due to the arithmetic equations shown in FIG. 3) of each of the moving average values DT1, DT2, DT3, . . . , DTk during the detection target period, where the detection target period is equal to one period of the reference clock signal CK0, like the case of the detection processing part 40 in the synchronous detection device according to the first exemplary embodiment.

Further, the amplitude calculation circuits 44(1), 44(2), 44(3), . . . , 44(k) in the detection processing part 40 calculate the amplitude values of the carrier waves 1, 2, 3, . . . , k, respectively, by using the same phase components D(1s), D(2s), D(3s), . . . , D(ks) and the orthogonal components D(1c), D(2c), D(3c), . . . , D(kc) obtained by the addition-subtraction circuits 42(1), 42(2), 42(3), . . . , 42(k), respectively.

As shown in FIG. 5, the amplitude calculation circuits 44(1), 44(2), 44(3), . . . , 44(k) in the detection processing part 40 calculate the amplitude values D(1), D(2), D(3), . . . , D(k) of the carrier waves 1, 2, 3, . . . , k by obtaining a square root ($\sqrt{[}$(components of target carrier waves)$^2$+(orthogonal components of target carrier waves)$^2$]) of a square of the same components and a square of the orthogonal components.

That is, even if the carrier waves 1, 2, 3, . . . , and k are not in synchronization with the clock signals CK1, CK2, CK3, . . . , CKk, in order to obtain the amplitude values D(1), D(2), D(3), . . . , D(k) of the carrier waves 1, 2, 3, . . . , and k, the addition-subtraction circuits 42(1), 42(2), 42(3), . . . , 42(k) calculate the same phase components D(1s), D(2s), D(3s), . . . , D(ks) and the orthogonal components D(1c), D(2c), D(3c), . . . , D(kc) of the carrier waves 1, 2, 3, . . . , and k, respectively, and the amplitude calculation circuits 44(1), 44(2), 44(3), . . . , 44(k) obtain a square root of square values of those components, as previously described.

The unwanted component eliminating part 50 is composed of arithmetic circuits 52(1), 52(2), 52(3), . . . , 52(k). The arithmetic circuits 52(1), 52(2), 52(3), . . . , 52(k) eliminate the components of the carrier waves odd frequency multiples of the carrier waves from the amplitude value D(1), D(2), D(3), . . . , D(k) of the carrier waves 1, 2, 3, . . . , and k calculated by the amplitude calculation circuits 44(1), 44(2), 44(3), . . . , 44(k) in the detection processing part 40. The arithmetic circuits 52(1), 52(2), 52(3), . . . , 52(k) output digital data D(1), D(2), D(3), . . . , D(k), respectively, which shows the amplitude values a1, a2, a3, . . . , ak of the carrier waves 1, 2, 3, . . . , k.

Figure 6:
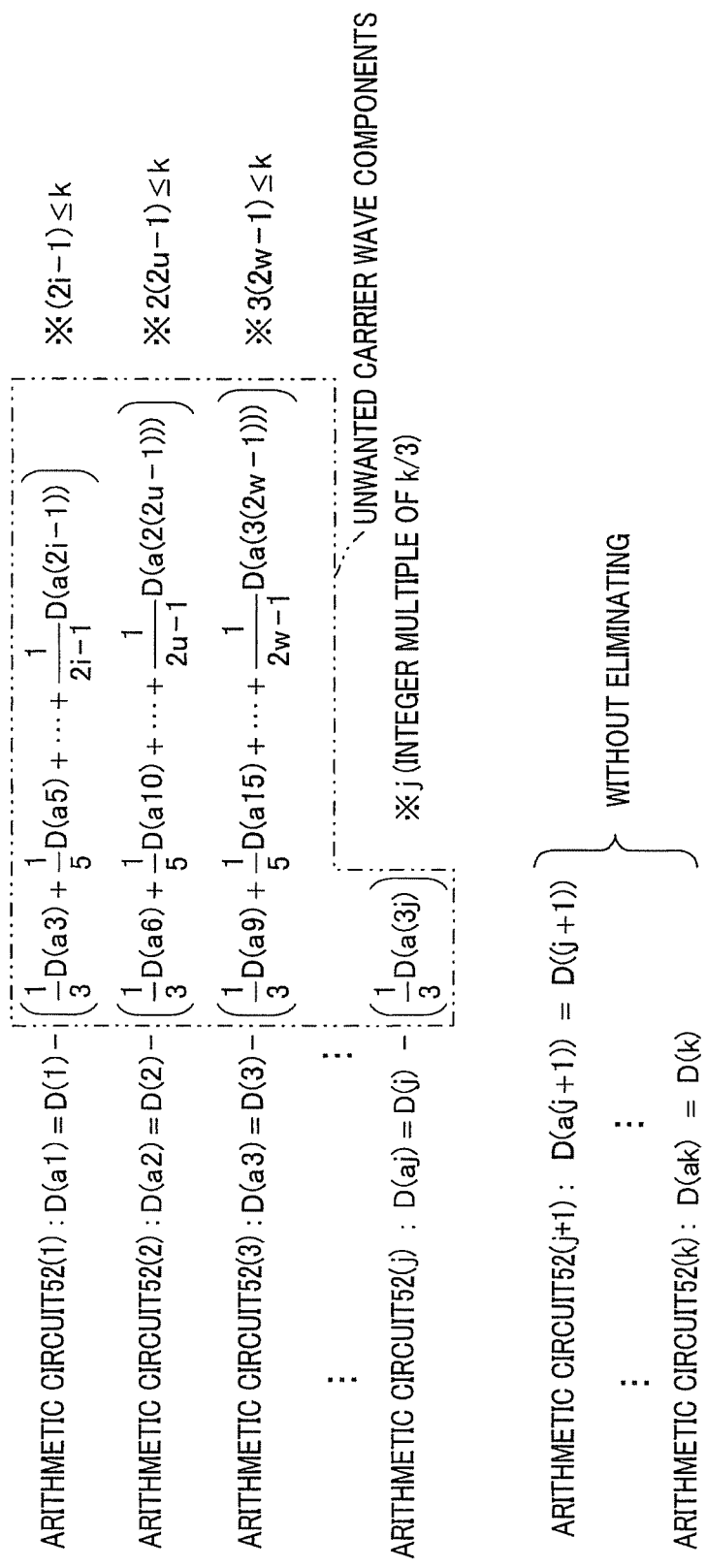
FIG. 6 is a view showing the operation of arithmetic circuits in an unwanted component eliminating part in the synchronous detection device according to the second exemplary embodiment of the present invention.

FIG. 6 is a view showing the operation of the arithmetic circuits 52(1), 52(2), 52(3), . . . , 52(k) in the unwanted component eliminating part 50 in the synchronous detection device according to the second exemplary embodiment of the present invention.

The arithmetic circuits 52(1), 52(2), 52(3), . . . , 52(k) in the unwanted component eliminating part 50 execute the arithmetic operations shown in FIG. 6, that is, subtracts from amplitude values odd submultiple (1/(2x+1)) of the amplitude values of the special carrier waves having an odd frequency multiple (2x+1) of the target carrier wave.

When one target carrier wave has a high frequency, an arithmetic circuit in the arithmetic circuits 52(1), 52(2), 52(3), . . . , 52(k) outputs the amplitude value of the carrier wave, which is not contained in the input signal Vin, having an odd frequency multiple (2x+1) of such a high frequency of the target carrier wave. This arithmetic circuit directly outputs the amplitude value, without any processing, calculated by the amplitude calculation circuits 44(1), 44(2), 44(3), . . . , 44(k) in the detection processing part 40. That is, this arithmetic circuit acts as a buffer in the unwanted component eliminating part 50, like the configuration of the unwanted component eliminating part 50 in the synchronous detection device according to the first exemplary embodiment.

As previously described in detail, the synchronous detection device according to the second exemplary embodiment executes the following operations (1), (2), (3) and (4) when executing the synchronous detection of the input signal Vin (FDM signal) obtained by synthesizing carrier waves 1, 2, 3, . . . , and k, each having a frequency an integer multiple (1, 2, 3, . . . , k times) of the frequency f0 of the reference clock CK0.

(1) The clock generation part 30 generates the clock signals CK1, CK2, CK3, . . . , CKk having a frequency four multiple of the frequency of each of the carrier waves 1, 2, 3, . . . , k.

(2) The TAD 10 calculates a moving average of the input signal Vin every quarter period of each of the carrier waves by using each of the clock signals CK1, CK2, CK3, . . . , CKk generated on the basis of reference clock signal CK0 by the clock generation part 30.

(3) The addition-subtraction circuits 42(1), 42(2), 42(3), . . . , 42(k) in the detection processing part 40 sequentially execute addition-subtraction operation of the moving average value DT1, DT2, DT3, . . . , DTk generated by and output from the TAD 10 on the basis of the clock signals CK1, CK2, CK3, . . . , CKk in order to obtain the same phase components D(1s), D(2s), D(3s), . . . , D(ks) and the orthogonal components D(1c), D(2c), D(3c), . . . , D(kc) in phase of the carrier waves 1, 2, 3, . . . , k.

(4) The amplitude calculation circuits 44(1), 44(2), 44(3), . . . , 44(k) in the detection processing part 40 calculate the amplitude value D(1), D(2), D(3), . . . , D(k) of the carrier waves 1, 2, 3, . . . , and k, respectively, on the basis of the same phase components D(1s), D(2s), D(3s), . . . , D(ks) and the orthogonal components D(1c), D(2c), D(3c), . . . , and D(kc) of the carrier waves 1, 2, 3, . . . , k.

The arithmetic circuit 52 in the unwanted component eliminating part 50 adjusts, by using the amplitude values of the carrier waves having an odd frequency multiple $3f, 5f, 7f$, $(2x+1)$ of a lower frequency of the carrier waves 1 to j, the amplitude values D(1), . . . , and D(j) of the carrier waves 1 to j having a low frequency containing the odd frequency multiples $3f, 5f, 7f, \ldots (2x+1)$ of the frequency "f" of the input signal Vin, in the amplitude values D(1), D(2), D(3), . . . , D(k) of the carrier waves 1 to k.

Similar to the synchronous detection circuit of the first exemplary embodiment, even if the input signal Vin is a FDM (Frequency-Division Multiplexing) signal synthesized by using carrier waves having frequencies an integer multiple (one, two, three, . . . , times) of the reference frequency f0, the synchronous detection device according to the second exemplary embodiment can eliminate, from the amplitude values of the carrier waves obtained by the detection processing part 40, unwanted components having a frequency an odd multiple of the frequency of the target carrier waves obtained by the detection processing part 40. Thus, the synchronous detection circuit of the second exemplary embodiment can detect the amplitude value of each of the carrier waves with high accuracy.

The synchronous detection circuit of the second exemplary embodiment has the same effects of the synchronous detection circuit of the first exemplary embodiment previously described.

Further, it is possible to apply the synchronous detection circuit of the second exemplary embodiment to various applications because the synchronous detection circuit of the second exemplary embodiment can obtain the amplitude value of each of the carrier waves 1 to k even if the phases of the carrier waves 1 to k are not in synchronization with the phases of the clock signals CK1 to CKk.

(Modifications)

Figure 7:
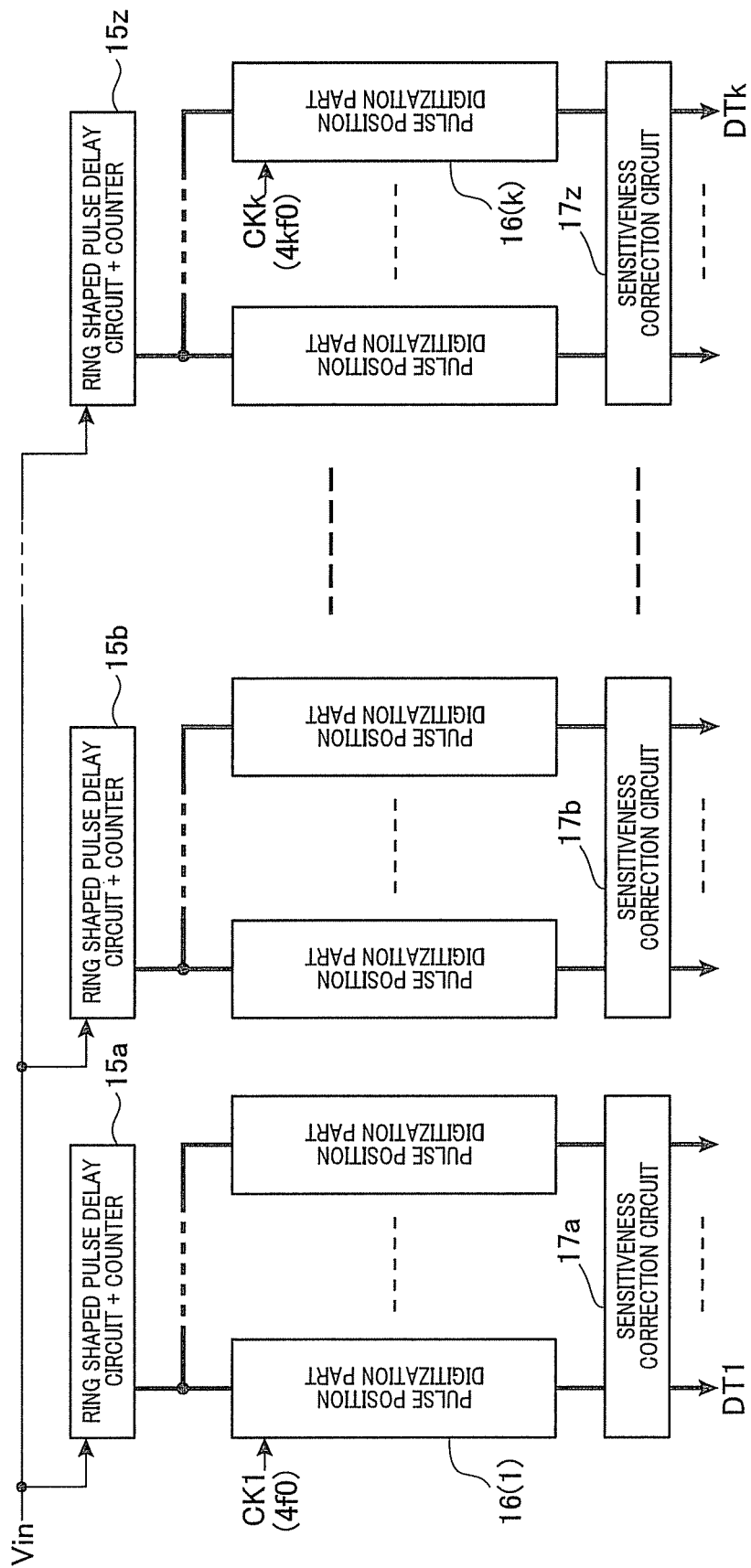
FIG. 7 is a view showing a block diagram of a configuration of a modification of the time analogue to digital converter (TAD) in the synchronous detection device.

FIG. 7 is a view showing a block diagram of a configuration of a modification of the TAD in the synchronous detection device.

In the structure of the synchronous detection circuit of the second exemplary embodiment, the TAD 10 has the ring-shaped pulse delay circuit 12 and the counter 14 which are commonly used by the k pulse position digitization parts 16(1), . . . , 16(k). However, the concept of the present invention is not limited by this structure. For example, it is possible for the TAD 10 to have a plurality of delay circuits 15a, 15b, 15c, . . . , 15z (z<k), each of which has the pulse delay circuit 12 and the counter 14. This structure of the TAD 10 shown in FIG. 7 allows each of the delay circuits 15a to 15z to have the corresponding pulse position digitization parts 16(1), . . . , 16(k), respectively.

This structure of the TAD 10 shown in FIG. 7 easily arranges the signal lines, which approximately have the same length, arranged between the pulse position digitization parts 16(1), . . . , 16(k) and the delay circuits 15a to 15z, respectively.

However, there is a possibility of generating fluctuation of the results of the moving average process (in other words, the moving average value) between the pulse position digitization parts 16(1) to 16(k) connected to the delay circuits 15a to 15z, respectively, by fluctuation in delay time between the delay circuits 12 in the delay circuits 15a to 15z.

As shown in FIG. 7, when the TAD 10 has a plurality of delay circuits such as the delay circuits 15a to 15z, it is preferable for the pulse position digitization parts 16(1), . . . , 16(k) in the TAD 10 to have sensitiveness correction circuit 17a to 17z, respectively, in order to correct the fluctuation of the calculation accuracy of the moving average values DT.

The sensitiveness correction circuits 17a to 17z correspond to correction parts, respectively, written in the claims. It is sufficient to obtain the correction characteristics of the sensitiveness correction circuits 17a to 17z in advance on the basis of the fluctuation of delay characteristics between the delay circuits 15a to 15z, by experiment or simulation.

Third Exemplary Embodiment

A description will be given of a synchronous detection device according to a third exemplary embodiment of the present invention.

Figure 8:
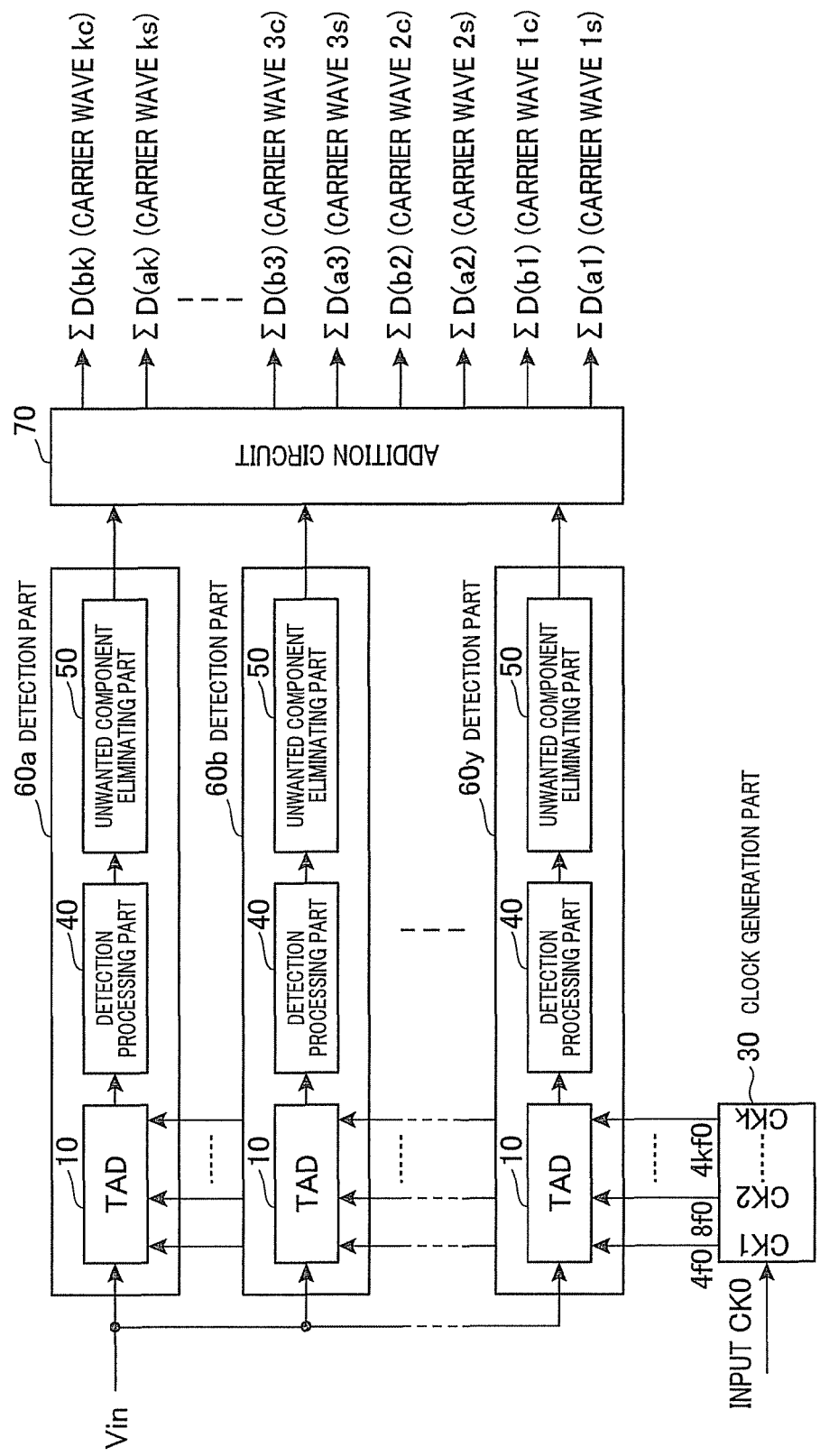
FIG. 8 is a view showing an entire configuration of a synchronous detection device according to a third exemplary embodiment of the present invention.

FIG. 8 is a view showing an entire configuration of the synchronous detection device according to the third exemplary embodiment.

Each of the first and second exemplary embodiments discloses the synchronous detection device equipped with the single TAD 10, the single detection processing part 40, and the single unwanted component eliminating part 50.

As shown in FIG. 8, the synchronous detection device according to the third exemplary embodiment has a plurality of detection parts 60a to 60z and an addition circuit 70. Each of the detection parts 60a to 60z has the TAD 10, the detection processing part 40, and the unwanted component eliminating part 50. The addition circuit 70 adds the amplitude value of each of the carrier waves obtained by the detection parts 60a to 60z every carrier wave, and outputs each of the addition results ΣD(a1), ΣD(b1), ΣD(a2), ΣD(b2), . . . , ΣD(ak), ΣD(bk). As shown in FIG. 8, the amplitude values as the outputs ΣD(a1), ΣD(b1), ΣD(a2), ΣD(b2), . . . , ΣD(ak), ΣD(bk) correspond to the carrier waves 1a, 1c, 2a, 2c, ks, kc, respectively.

The structure of the synchronous detection device according to the third exemplary embodiment shown in FIG. 8 allows the amplitude value of each carrier wave output from the addition circuit 70 becomes equal to an average value of the amplitude value which is simultaneously obtained by each of the detection parts 60a to 60z. The structure of the synchronous detection device according to the third exemplary embodiment makes it possible to increase the detection and calculation accuracy of the amplitude value of each carrier wave.

As shown in FIG. 8, the synchronous detection device according to the third exemplary embodiment is equipped with the single clock generation part 30 which generates the clock signals CK1, CK2, CK3, . . . , CKk and supplies the generated clock signals CK1, CK2, CK3, . . . , CKk to the TADs 10 in the detection parts 60a, 60b, 60c, ..., 60y. The clock signals CK1, CK2, CK3, ..., CKk are necessary to drive the TADs 10 in the detection parts 60a to 60y.

As shown in FIG. 8, the structure of the synchronous detection device according to the third exemplary embodiment allows each of the detection parts 60a to 60z to execute the synchronous detection of the carrier waves at the same timing. It is thereby possible to obtain the amplitude value of each of the carrier waves with more high accuracy.

The addition circuit 70 adds the amplitude value of each of the carrier waves 1s, 1c, 2s, 2c, ks, kc obtained by each of the detection part 60a to 60y, and divides the addition result by the number of the detection parts 60a to 60y in order to average the amplitude value of each carrier wave obtained by the detection parts 60a to 60y every carrier wave.

Fourth Exemplary Embodiment

A description will be given of a synchronous detection device according to a fourth exemplary embodiment of the present invention.

Figure 9:
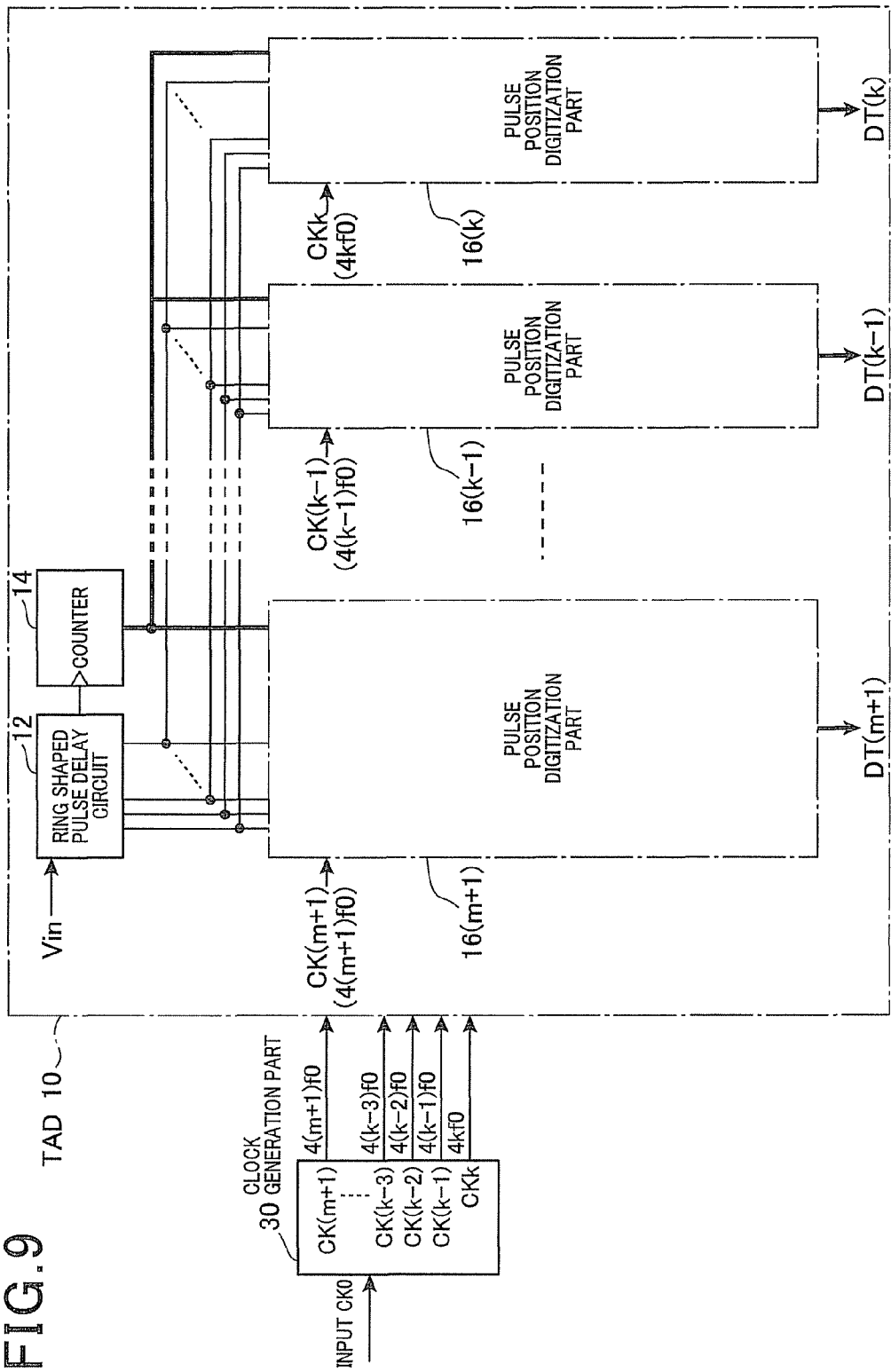
FIG. 9 is a view showing a block diagram of a configuration of a time analogue to digital converter (TAD) and a clock generation part in a synchronous detection device according to a fourth exemplary embodiment of the present invention.
Figure 10:
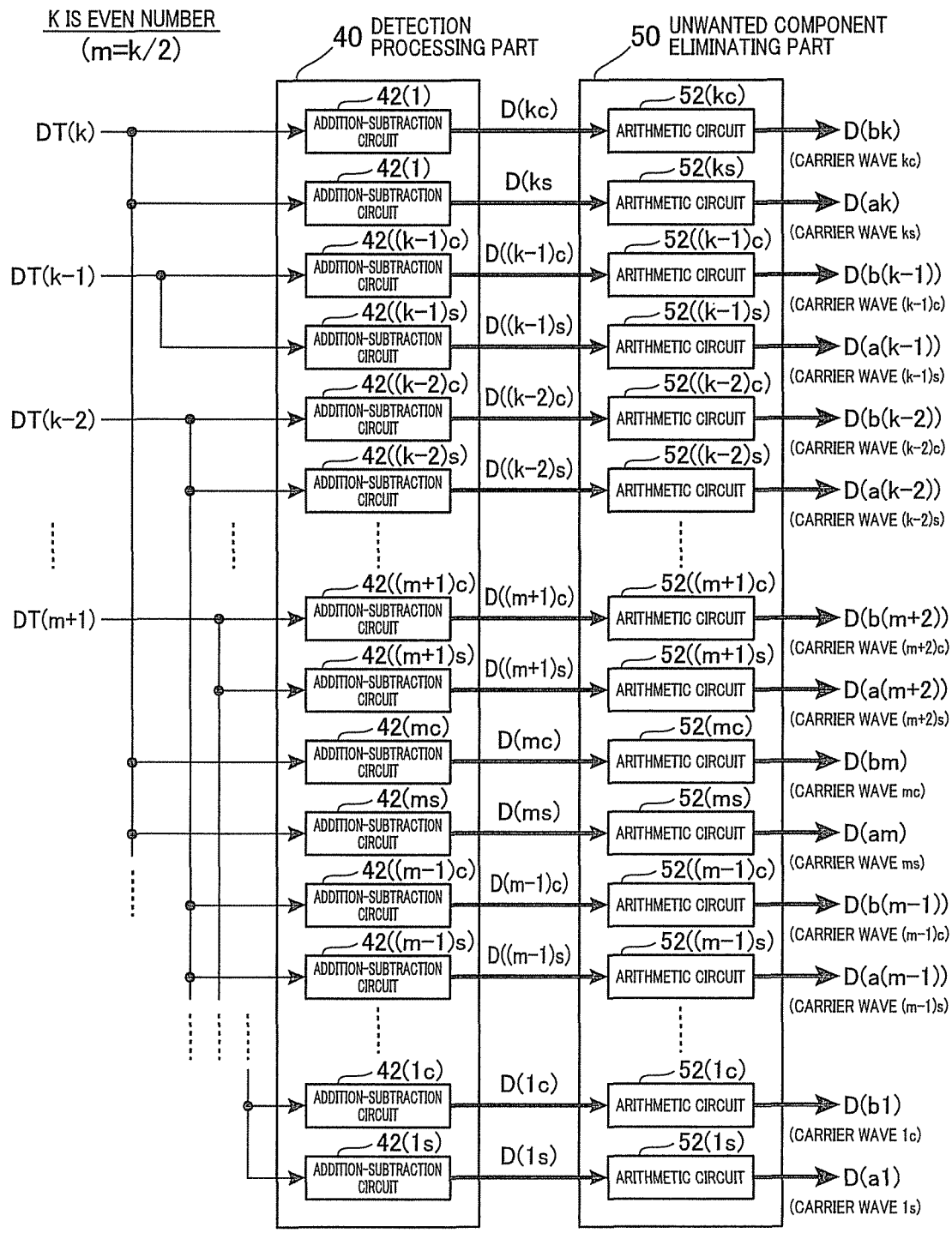
FIG. 10 is a view showing a block diagram of a configuration of a detection processing part and a unwanted component eliminating part in the synchronous detection device according to the fourth exemplary embodiment of the present invention.

FIG. 9 is a view showing a block diagram of a configuration of the clock generation part 30 and the TAD 10 in the synchronous detection device according to the fourth exemplary embodiment. FIG. 10 is a view showing a block diagram of a configuration of the detection processing part 40 and the unwanted component eliminating part 50 in the synchronous detection device according to the fourth exemplary embodiment. FIG. 11 is a view showing a block diagram of a configuration of a modification of the detection processing part 40 and the unwanted component eliminating part 50 in the synchronous detection device according to the fourth exemplary embodiment.

Similar to the structure of the synchronous detection device according to the first exemplary embodiment, the synchronous detection device according to the fourth exemplary embodiment is equipped with the clock generation part 30 and the TAD 10 shown in FIG. 9 and the detection processing part 40 and the unwanted component eliminating part 50 shown in FIG. 10. Further, similar to the function of the synchronous detection device according to the first exemplary embodiment, the synchronous detection device according to the fourth exemplary embodiment receives an OFDM signal as the input signal Vin, and detects the amplitude value D(a1), to D(ak), D(b1) to D(bk) of the carrier waves is to 1k, and is to kc. That is, the OFDM signal is generated by synthesizing carrier waves to have been processed by amplitude modulation. The carrier waves are composed of two types of carrier waves having a different phase by 90°. One type has carrier waves 1s, 2s, 3s, ..., and ks (s designates a sign curve) and carrier waves 1c, 2c, 3, ..., and kc (c designates a cosine wave). For example, the carrier wave 1s is different in phase from the carrier wave 1c by 90°, and the carrier wave 2s is different in phase from the carrier wave 2c by 90°. The carrier waves 1s, 2s, 3s, ... and the carrier waves 1c, 2c, 3c, ... are generated by integer multiple (1, 2, 3, ..., k) of the frequency f0 of the reference clock CK0, respectively.

As shown in FIG. 9, the clock generation part 30 in the synchronous detection device according to the fourth exemplary embodiment generates a plurality of clock signals CKk to CK(m+1) which are in synchronization with quarter period of the period of each of carrier waves within a range from specified carrier waves ks and kc having the maximum frequency to carrier waves (m+1)s, ..., and (m+1)c having a frequency (m+1)f0, as a multiple (m+1) of the frequency of the reference clock CK0, where the clock signal frequency is obtained by adding the value of 1 to a multiple m (=k/2) which is half of the multiple k of the frequency kf0 of the specified carrier waves ks and kc.

The clock signals CKk to CK (m+1) have the frequencies 4kf0 to 4(m+1)f0, respectively.

The TAD 10 has the pulse position digitization parts 16(k), ..., and 16(m+1). When receiving the clock signals CKk to CK (m+1) generated by and supplied by the clock generation part 30, the pulse position digitization parts 16(k), ..., and 16(m+1) calculate the moving average values DTk to DT(m+1) of the input signal Vin every period of the clock signals CKk to CK (m+1), respectively.

The number of the pulse position digitization parts 16(k), ..., and 16(m+1) in the TAD 10 is k/2 when the number k of the frequencies of the carrier waves is to kc is an even number, and is (k/2)+1 when the number k of the frequencies of the carrier waves is to kc is an odd number.

On the other hand, as shown in FIG. 10 and FIG. 11, although the detection processing part 40 has the 2k addition-subtraction circuits 42(1s), 42(1c), ..., 42(ks), and 42(kc), like the detection processing part 40 in the synchronous detection device according to the first exemplary embodiment, it is impossible for the addition-subtraction circuits 42(1s), 42(1c), ..., 42(ks), 42(kc) in the detection processing part 40 to receive the k moving average values DTk to DT1 corresponding to the carrier waves is to kc because the TAD 10 outputs the k/2 moving average values DTk to DT(m+1) (k is an even number), or the (k/2)+1 moving average values DTk to DT(m+1) (k is an odd number) corresponding to the carrier waves ks, kc, ..., (m+1)s, (m+1)c.

As shown in FIG. 10 and FIG. 11, the addition-subtraction circuits 42((m+1)s), 42((m+1)c), ..., 42(ks), 42(kc) in the detection processing part 40 receive the moving average values DT(m+1) to DTk supplied by the TAD 10. Further, the addition-subtraction circuits 42(1s), 42(1c), ..., 42(ms), 42(mc) in the detection processing part 40 receive the moving average values DT(m+1) to DTk (if k is an even number) or DT(m+1) to DT(k−1) (if k is an odd number) corresponding to the carrier waves having a frequency double of the target carrier waves 1s, 1c, ..., ms, mc supplied, by the TAD 10. For example, when the variable "k" is an odd number, the value "m" in FIG. 11 is the integer value obtained by truncation (e.g. when k=9, k/2=4.5, and m=4).

As a result, it is possible for the synchronous detection device according to the fourth exemplary embodiment to have the same effects of the synchronous detection results obtained by the synchronous detection device according to the first exemplary embodiment.

The structure of the synchronous detection device according to the fourth exemplary embodiment makes it possible to have the pulse position digitization parts in the TAD 10 whose number is half (½) or (½)+1 times of the number of the pulse position digitization parts in the TAD 10 in the synchronous detection device according to the first exemplary embodiment. In other words, the fourth exemplary embodiment provides the synchronous detection device equipped with the TAD 10 having a simple structure, and decreases the manufacturing cost.

(Modifications)

FIG. 12 is a view showing a block diagram of a configuration of the detection processing part and the unwanted component eliminating part in a modification of the synchronous detection device.

As previously described, the fourth exemplary embodiment provides an example of the TAD 10 having a simple structure installed in the synchronous detection device of the first exemplary embodiment. However, the concept of the fourth embodiment is not limited by this structure. It is possible to apply the concept of the fourth embodiment to the synchronous detection device of the second exemplary embodiment.

That is, it is also possible to have the same effects of the fourth exemplary embodiment when the synchronous detection device of the second exemplary embodiment is equipped with the clock generation part 30 and the TAD 10 shown in FIG. 9. In this case, because the detection processing part 40 in the second exemplary embodiment shown in FIG. 9 has the addition-subtraction circuits 42(1) to 42(k) corresponding to the carrier waves i to k, respectively, it is sufficient, as shown in FIG. 12, that the addition-subtraction circuits 42(m+1) to 42(k) receive the moving average values DT(m+1) to DTk supplied by the TAD 10, and the addition-subtraction circuits 42(1) to 42(m) receive the moving average values DT(m+1) to DTk corresponding to the carrier waves having a frequency which is double the frequency of the carrier waves 1 to m as the targets of addition-subtraction operation.

FIG. 12 shows a structure of a modification of the detection processing part 40 in the synchronous detection device according to the fourth embodiment when the variable "k" is an even number only. When the variable "k" is an odd number, it is sufficient for the addition-subtraction circuits 42(1) to 42(m) receive the moving average values DT(m+1) to DT(k−1) corresponding to the carrier waves having a frequency double of the frequency of the carrier waves 1 to m as the targets of addition-subtraction operation.

As previously described in detail, the first to fourth exemplary embodiments show the synchronous detection devices having various improved and novel structures and effects. However, the concept of the present invention is not limited by those structures. For example, the first to fourth exemplary embodiments use the clock generation part 30 which generates the clock signals having a period a quarter of the period of each carrier wave as a detection target. It is further possible for the clock generation part 30 to generate the clock signals CK1 to CKk having a period half of the period of each carrier wave as the detection target when the input signal Vin is composed of sine carrier waves having a frequency an integer multiple of the frequency f0 of the reference clock signal CK0 only and each carrier wave is in synchronization with the reference clock signal CK0.

In this case, it is possible for the detection processing part 40 to obtain the amplitude value of each of the carrier waves 1 to k when the TAD 10 calculates moving average values of the input signal Vin during two periods, namely, in the front half period (0 to 180°) and the latter half period (180° to 360°) of each of the clock signals CK1 to CKk, and the addition-subtraction circuits in the detection processing part 40 add the moving average values DT1 to DTk, (in more detail, add the absolute values of the moving average values DT1 to DTk) supplied by the TAD 10.

In this case, the unwanted component eliminating part 50 eliminates unwanted components of the carrier waves in order to obtain the amplitude value of each of the carrier waves with high accuracy.

(Features and Effects of the Method and the Synchronous Detection Device According to the Present Invention)

As previously described in detail, the present invention discloses and provides an improved and novel method of executing a synchronous detection. The method detects an amplitude value of each of carrier waves as a detection target. In the method, the multiplex signal is received as an input signal composed of a plurality of carrier waves having a different frequency. The moving average of each of the carrier waves in the received multiplex signal is sequentially executed every half or quarter period of each of the carrier waves. The moving average of each of the carrier wave is added during one half period of each of the carrier waves, and subtracted during the other half period which is the remaining half of the period of each of the carrier wave Further, the moving average of each of the carrier wave is added during a half period and subtracted during the other half period of each of the carrier waves. The unwanted amplitude values of carrier waves, whose frequency is higher than the frequency of the carrier waves as the detection target are eliminated from the amplitude values of the entire of the carrier waves.

According to the synchronous detection method of the present invention, on executing the synchronous detection of the multiplex signal obtained by synthesizing carrier waves having a frequency an integer multiple (1, 2, 3, . . . multiple) of the frequency f0 of the reference clock CK0, it is possible for the eliminating step to eliminate the unwanted signal components, namely, the unwanted amplitude values of the special carrier waves from the amplitude values of the carrier waves as the detection target even if the amplitude values of the carrier waves obtained by the synchronous detection contain the signal components as the unwanted amplitude values of the special carrier waves having an odd frequency multiple of the frequency of the carrier waves as the detection target.

According to the present invention, even if the multiplex signal is composed of a plurality of carrier waves having a frequency an integer multiple of the frequency f0 of the reference clock signal CK0, it is possible to detect the amplitude value of each of the carrier waves with high accuracy.

Further, because the method according to the present invention executes the improved and novel step capable of eliminating the unwanted amplitude values from the amplitude values obtained by the synchronous detection step, in addition to the other known steps, it is possible to apply the concept of the present invention to a digital signal processing method using a TAD (time analogue to digital converter) and without using analogue circuits such as an operational amplifier and an analogue filter).

Those functions and features of the method according to the present invention make it possible to allow a synchronous detection device for executing the method to have a simple structure, and to produce the synchronous detection device with a low manufacturing cost.

According to the present invention, it is possible for the method to use a multiplex signal within a narrow frequency band, and to increase the efficiency in use of the frequency band through which a plurality of multiplex signals is transmitted. Further, it is possible for the method of the present invention to be applied to the synchronous detection device having a small circuit structure, and to decrease the cost of a communication system using the above method and device.

In the synchronous detection method according to the present invention, it is preferable for the eliminating step to eliminate the unwanted amplitude values of the special carrier waves from the amplitude values of the carrier waves as the detection target by subtracting a value of an odd submultiple $(1/(2x+1))$ of the amplitude value of the special carrier waves having an odd frequency multiple $(2x+1)$ of the carrier wave from the amplitude values of the carrier waves as the detection target. In this case, the variable x is a positive integer.

This makes it possible to simply and easily eliminate the unwanted amplitude values as signal components of the special carrier waves having an odd frequency multiple of the frequency of the carrier waves as the detection target from the detection results (namely, the amplitude values) of the carrier waves as the detection target which form the multiplex signal as the input signal.

The present invention further provides the improved and novel synchronous detection device. The synchronous detection device detects such amplitude values of the carrier waves as the detection target. The synchronous detection device has the moving average calculation part, the detection processing part and the unwanted component eliminating part. The moving average calculation part receives a multiplex signal as an input signal composed of a plurality of carrier waves having a different frequency. The moving average calculation part sequentially calculates a moving average of each of the carrier waves in the received multiplex signal every half (or quarter) period of a period of each of the carrier waves. The detection processing part adds the moving average of each of the carrier wave, obtained by the moving average calculation part, during a one-half period which is a one-half of the period of each of the carrier waves.

The detection processing part further subtracts the moving average of each of the carrier wave during the other-half period which is the remaining half of the period of each of the carrier wave. The unwanted component eliminating part eliminates, from the amplitude values of the carrier waves, unwanted amplitude values of other carrier waves whose frequencies are higher than the frequencies of the carrier waves as the detection target.

The synchronous detection device having the above improved and novel structure has the same effects of the synchronous detection method previously described.

Further, in the synchronous detection device, the unwanted component eliminating part eliminates the unwanted amplitude values of the special carrier waves from the amplitude values of the carrier waves as the detection target by subtracting, from the amplitude values of the carrier wave as the detection target, values odd submultiple ($1/(2x+1)$) of the amplitude values of the special carrier waves having an off frequency multiple ($2x+1$) of the carrier waves. In this case, the variable x is a positive integer.

It is therefore possible for the synchronous detection device to have the same effects of the method previously described.

Next, in the synchronous detection device, the moving average calculation part sequentially calculates the moving average of the multiplex signal as the input signal every quarter period of each of the carrier waves. The detection processing part shifts a result of the moving average of each of the carrier waves obtained by the moving average calculation part by a period quarter of the period of each of the carrier waves. The detection processing part then executes addition-subtraction operation of the shifted result of the moving average in order to execute a synchronous detection of each of the carrier waves composed of a sine wave and a cosine wave having the same frequency and a quarter shifted period in phase to each other.

Further, the unwanted component eliminating part eliminates the unwanted amplitude values of the special carrier waves from the amplitude values of the carrier waves as the detection target by subtracting an amplitude value which is an odd-submultiple ($1/(2x+1)$) of the amplitude value of the special carrier waves composed of a sine wave and a cosine wave having the same phase and an odd multiplex ($2x+1$) frequency of the carrier wave from the amplitude values of the carrier waves composed of a sine wave and a cosine wave obtained by the detection processing part.

According to the synchronous detection device of the present invention, it is possible to detect the amplitude values of the carrier waves with high accuracy when the multiplex signal as the input signal is an OFDM (Orthogonal Frequency-Division Multiplexing) signal which contains two types of carrier waves (a sine wave and a cosine wave whose phase is shifted to each other by 90°) per frequency.

Still further, in the synchronous detection device according to the present invention, the moving average calculation part sequentially calculates the moving average of the multiplex signal as the input signal every quarter period each of the carrier waves. The detection processing part shifts a result of the moving average of each of the carrier waves obtained by the moving average calculation part by a period quarter of the period in phase of each of the carrier waves. Further, the detection processing part executes addition-subtraction operation of the shifted result of the moving average in order to execute a synchronous detection of the carrier waves of two types having the same frequency and a quarter shifted period in phase relative to each other. The carrier wave as one type obtained by the synchronous detection becomes the same phase component, and the carrier wave of the other type obtained by the synchronous detection becomes an orthogonal phase component. The detection processing part calculates a square root of a sum of a square value of the same phase component and a sum of a square value of the orthogonal phase component in order to obtain the amplitude values of the carrier waves having unknown phase.

According to the synchronous detection device of the present invention, it is possible to detect the amplitude value of the carrier wave as the detection target even if the timing of the moving average is different from the phase of the carrier wave contained in the multiplex signal when the moving average calculation part calculates the moving average of the carrier wave as the detection target by using the period quarter of the frequency of the carrier wave.

The synchronous detection device of the present invention further has the clock generation part. The clock generation part generates a plurality of the clock signals which is in synchronization with a period quarter of the period of each of the carrier waves.

In the synchronous detection device, the moving average calculation part has the pulse delay part and a plurality of the pulse position digitization parts. In the synchronous detection device, the pulse delay part has a plurality of the delay units connected in series. Each of the delay parts delays the input pulse of the input signal by a delay time thereof corresponding to the signal level of the multiple signal as the input signal. Each of the delay parts transmits the delayed input pulse to the following delay units. Each of the pulse position digitization parts detects a position of the input pulse in the pulse delay part in synchronization with a plurality of the clock signals generated by the clock generation part in order to calculate the moving average per quarter of the period of each of the carrier waves contained in the multiplex signal as the input signal.

According to the synchronous detection device of the present invention, it is possible to obtain the moving average of each of the carrier waves every period of each of the carrier waves by using one pulse delay part composed of a plurality of the delay units which detects the position of the pulse signal in the pulse delay part every quarter period of each of the carrier waves as the detection target, like the known synchronous detection device.

It is thereby possible to obtain the moving average value of each of the carrier waves every period of each of the carrier waves with an approximate constant resolution and high accuracy. Still further, it is possible to execute the synchronous detection of the multiplex signal having the carrier waves as the input signal with high accuracy and a low cost because of not being necessary to execute A/D conversion of the input signal at high speed in order to obtain the moving average value of each of the carrier waves.

In the synchronous detection device according to the present invention, the clock generation part uses the reference clock signal CK0 having a frequency f0 which is equal to the minimum frequency in the entire of the carrier waves contained in the multiplex signal. The clock generation part generates the plurality of the clock signals, to be used for executing the moving average, by multiplexing the reference clock.

This structure of the clock generation part makes it possible to prevent the detection accuracy of each of the carrier waves from being decreased on the basis of a difference in phase between the clock signals because it is possible to generate, on the basis of the reference clock signal CK0, a plurality of the clock signals CK1, CK2, CK3, ..., CKk which is necessary to calculate the moving average of each of the carrier waves.

According to the synchronous detection device of the present invention, the clock generation part generates a plurality of the clock signals. These clock signals are in synchronization with a period quarter of the period of each of the carrier waves having a high frequency within a range. This range is from a specified carrier wave having the maximum frequency in the carrier waves contained in the multiplex signal as the input signal to the carrier wave having a frequency multiplex ((k/2)+1) of the frequency of the reference clock signal of the specified carrier wave, where the variable ((k/2)+1) is obtained by adding 1 to a half (k/2) of the frequency k which is k multiple of the frequency of the reference clock signal.

The pulse position digitization parts in the pulse delay part are installed corresponding to the clock signals generated by the clock generation part, respectively.

That is, the clock generation part in the synchronous detection device according to the present invention does not generate a plurality of clock signals which corresponds to the entire of the carrier waves as the detection target. When the reference clock signal has the frequency f0, the clock generation part generates the clock signals corresponding to a high frequency range (approximately half of the entire carrier waves when each of the carrier waves has a frequency an integer multiple of the frequency f0 of the reference clock signal CK0) from the frequency of the specified carrier wave to the frequency ((k/2)+1)·f0 of the carrier wave. The moving average calculation part calculates the moving average of the input signal (multiplex signal) by using the clock signals generated by the clock generation part.

As a result, the number of the obtained moving average values approximately becomes a half of the entire number of the carrier waves as the detection target. This structure makes it possible to decrease the total number of the pulse position digitizing parts capable of calculating the moving average values of the carrier waves. Further, this provides the synchronous detection device with a simple structure.

Further, because no clock signal having a quarter frequency of the frequency of each of carrier waves in the low frequency side which are approximately a half of the entire carrier waves is generated, the detection processing part executes the detection of the amplitude values of those carrier waves by executing addition-subtraction operation of the calculated moving average values of those carrier waves having frequencies, in the low frequency side, an even multiple of the carrier wave. The low frequency side of each of the carrier waves in a half part of the entire of the carrier waves, the corresponding clock signal of the is not generated, is quarter of the frequency of the carrier wave.

Further, the present invention provides the synchronous detection device with a simple structure, decreases the manufacturing cost, and increases the detection accuracy when compared with the conventional synchronous detection device to generate the moving average value of each of the carrier waves contained in an input signal.

Although the pulse delay part is installed in the synchronous detection device having the above structure, it is possible for the synchronous detection device to have a plurality of the pulse delay parts so that the pulse delay parts and the pulse position digitization parts are arranged in one to one correspondence in order to have the uniform length of wires which connects each pair composed of the pulse delay part and its corresponding pulse position digitization part. Using the wires having the same length generates the same time delay in the wires when signals are transferred through the wires between them.

Because it is difficult to prevent the generation of time delay between the wires, with which the pulse delay parts and the pulse position digitization parts are electrically connected together, it is preferable for each of the pulse delay parts to have the corresponding correction part in addition to the corresponding pulse position digitization part. The correction part adjusts a digitization error caused by fluctuation of delay characteristics of the corresponding pulse delay part.

It is acceptable for each of the detection processing part to execute addition-subtraction operation of the moving average values obtained by the moving average calculation part every period of each of the carrier waves as the detection target in order to obtain the amplitude value of each of the carrier waves. However, this structure has a possibility of it being difficult to obtain the amplitude values of each of the carrier waves at the same timing, namely, this structure calculates the amplitude values of each of the carrier waves at a different timing.

In order to avoid this, it is acceptable for the detection processing part to detect the amplitude value of each of the carrier waves by executing addition-subtraction operation of the result of the moving average obtained by the moving average calculation part during a detection period equal to the period of the carrier wave having the minimum frequency in a plurality of the carrier waves as the detection target.

Accordingly, this structure of the synchronous detection device calculates all of the amplitude values of the carrier waves during the same period, and it is possible to prevent the fluctuation of the timing to calculate the amplitude values of all of the carrier waves from occurring. Still further, because the amplitude values of the carrier waves in a high frequency side are obtained by executing addition-subtraction operation of the moving average values of the carrier waves over plurality of periods, it is possible to prevent incorrect detection caused by noises.

The present invention further provides the synchronous detection device equipped with a plurality of the synchronous detection parts, and the arithmetic part. Each of the synchronous detection parts has the moving average calculation part, the detection processing part, the unwanted component eliminating part, and an arithmetic part. The arithmetic part calculates the amplitude values of the carrier waves by adding or averaging, each carrier wave, the amplitude values obtained by the synchronous detection parts.

This structure makes it possible to increase the resolution of the amplitude value of each of the carrier waves, which is finally obtained by the arithmetic part, and to further enhance the accuracy of the synchronous detection for each of the carrier waves as the detection target.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A synchronous detection method of detecting amplitude values of each of carrier waves as detection targets, comprising steps of:
   receiving a multiplex signal as an input signal composed of a plurality of carrier waves having a different frequency;
   sequentially executing a moving average of each of the carrier waves in the received multiplex signal every half or quarter period of each of the carrier waves;
   adding the moving average of each of the carrier wave during a one-half period which is a one-half of the period of each of the carrier waves, and subtracting the moving average of each of the carrier wave during the other-half period which is the remaining half of the period of each of the carrier wave; and
   eliminating, from the amplitude values of the carrier waves as the detection targets, unwanted amplitude values of special carrier waves whose frequencies are higher than the frequencies of the carrier waves as the detection targets.

2. The synchronous detection method according to claim 1, wherein the eliminating step eliminates the unwanted amplitude values of the special carrier waves from the amplitude values of the carrier waves as the detection target by subtracting an odd submultiple $(1/(2x+1))$ of the amplitude value of specific carrier waves having an odd multiple $(2x+1)$ of the frequency of the carrier wave from the amplitude value of the carrier wave as the detection target, where x is a positive integer.

3. A synchronous detection device for detecting an amplitude value of each of carrier waves as the detection target, comprising:
   a moving average calculation part which receives a multiplex signal as an input signal composed of a plurality of carrier waves having a different frequency, and sequentially calculates a moving average of each of carrier waves in the received multiplex signal every half (or quarter) period of each of the carrier waves;
   a detection processing part for adding the moving average of each of the carrier waves, obtained by the moving average calculation part, during a one-half period which is one half of the period of each of the carrier waves, and for subtracting the moving average of each of the carrier wave during the other-half period which is the remaining half of the period of each of the carrier waves; and
   an unwanted component eliminating part which eliminates, from the amplitude values of the carrier waves as the detection target, unwanted amplitude values of other carrier waves whose frequencies are higher than the frequencies of the carrier waves as the detection target.

4. The synchronous detection device according to claim 3, wherein the unwanted component eliminating part eliminates the unwanted amplitude values of the carrier waves from the amplitude values of the carrier waves by subtracting, from the amplitude value of the carrier waves as the detection target, a value which is an odd submultiple $(1/(2x+1))$ of the amplitude values of the special carrier waves having a frequency which is an odd multiple $(2x+1)$ of the carrier waves, where x is a positive integer.

5. The synchronous detection device according to claim 4, wherein the moving average calculation part sequentially calculates the moving average of the multiplex signal as the input signal every quarter period of each of the carrier waves,
   the detection processing part shifts a result of the moving average of each of the carrier waves obtained by the moving average calculation part by a quarter of the period of each of the carrier waves, and executes addition-subtraction operation of the shifted result of the moving average in order to execute the synchronous detection of each of the carrier waves composed of a sine wave and a cosine wave having the same frequency and a quarter shifted period in phase to each other, and
   the unwanted component eliminating part eliminates the unwanted amplitude values of the special carrier waves from the amplitude values of the carrier waves as the detection target by subtracting an amplitude value which is an odd submultiple $(1/(2x+1))$ of the amplitude value of the special carrier waves composed of a sine wave and a cosine wave having the same phase and a frequency which is an odd multiple $(2x+1)$ of the carrier wave from the amplitude values of the carrier waves composed of the sine wave and the cosine wave obtained by the detection processing part.

6. The synchronous detection device according to claim 4, wherein the moving average calculation part sequentially calculates the moving average of the multiplex signal as the input signal every quarter period of each of the carrier waves, and
   the detection processing part shifts a result of the moving average of each of the carrier waves obtained by the moving average calculation part by a quarter of the period in phase of each of the carrier waves, and executes addition-subtraction operation of the shifted result of the moving average in order to execute a synchronous detection of the carrier waves of two types having the same frequency and a quarter shifted period in phase to each other, and
   the carrier wave as one type obtained by the synchronous detection becomes the same phase component, and the carrier wave of the other type obtained by the synchronous detection becomes an orthogonal phase component, and
   the detection processing part calculates a square root of a sum of a square value of the same phase component and a sum of a square value of the orthogonal phase component in order to obtain the amplitude values of the carrier waves having unknown phase.

7. The synchronous detection device according to claim 3, further comprising a clock generation part which generates a plurality of clock signals which are in synchronization with a quarter of the period of each of the carrier waves,
   wherein the moving average calculation part comprises: a pulse delay part; and a plurality of pulse position digitization parts,
   wherein the pulse delay part comprises a plurality of delay units connected in series, each of the delay parts delays the input pulse of the input signal by a delay time thereof corresponding to the signal level of the multiple signal as the input signal, and transmits the delayed input pulse to the following delay units, and
   each of the pulse position digitization parts detects a position of the input pulse in the pulse delay part in synchronization with a plurality of the clock signals generated by the clock generation part in order to calculate the moving average per quarter of the period of each of the carrier waves contained in the multiplex signal as the input signal.

8. The synchronous detection device according to claim 7, wherein the clock generation part uses a reference clock signal having a frequency which is equal to the minimum frequency in the carrier waves contained in the multiplex signal, and the clock generation part generates the plurality of the clock signals, to be used for executing the moving average, by multiplexing the reference clock.

9. The synchronous detection device according to claim 8, wherein the clock generation part generates a plurality of clock signals which are in synchronization with a quarter of the period of each of the carrier waves having a high frequency within a range from a specified carrier wave having the maximum frequency in the carrier waves contained in the multiplex signal to the carrier wave having a frequency multiplex (k/2+1) of the frequency of the reference clock signal of the specified carrier wave, where k is the multiple of the frequency of the reference clock signal, and wherein the pulse position digitization parts in the pulse delay part are installed corresponding to the clock signals generated by the clock generation part, respectively.

10. The synchronous detection device according to claim 7, wherein the moving average calculation part further comprises a plurality of the pulse delay parts, and wherein each of the pulse delay parts has the corresponding pulse position digitization part and a corresponding correction part, and the correction part adjusts a digitization error caused by fluctuation of delay characteristics of the corresponding pulse delay part.

11. The synchronous detection device according to claim 3, wherein the detection processing part detects the amplitude value of each of the carrier waves by executing addition-subtraction operation of the result of the moving average obtained by the moving average calculation part during a detection period equal to the period of the carrier wave having the minimum frequency in the carrier waves as the detection target.

12. The synchronous detection device according to claim 3, comprising a plurality of synchronous detection parts and an arithmetic part, wherein each of the synchronous detection parts comprises the moving average calculation part, the detection processing part, the unwanted component eliminating part, and an arithmetic part, wherein the arithmetic part calculates the amplitude values of the carrier waves by adding or averaging, every carrier wave, the amplitude values obtained by the synchronous detection parts.

* * * * *

UNITED STATES PATENT AND TRADEMARK OFFICE
CERTIFICATE OF CORRECTION

Page 1 of 1

PATENT NO.        : 8,649,474 B2
APPLICATION NO.   : 13/424720
DATED             : February 11, 2014
INVENTOR(S)       : Tomohito Terazawa It is certified that error appears in the above-identified patent and that said Letters Patent is hereby corrected as shown below:

In the Claims:

Col. 21, Claim 3, line 56, delete "other" and insert --special--.

Signed and Sealed this
Twenty-seventh Day of May, 2014

Michelle K. Lee
*Deputy Director of the United States Patent and Trademark Office*